(12) United States Patent
Park

(10) Patent No.: US 6,845,423 B2
(45) Date of Patent: Jan. 18, 2005

(54) CONFLICT-FREE MEMORY SYSTEM AND METHOD OF ADDRESS CALCULATION AND DATA ROUTING BY USING THE SAME

(76) Inventor: Jong-Won Park, 812-1201 Saemirae, Apt., Daejeon-shi (KR), 305-320

(*) Notice: Subject to any disclaimer, the term of this patent is extended or adjusted under 35 U.S.C. 154(b) by 433 days.

(21) Appl. No.: 10/106,542

(22) Filed: Mar. 26, 2002

(65) Prior Publication Data

US 2003/0126351 A1 Jul. 3, 2003

(51) Int. Cl.$^7$ .............................................. G06F 12/00
(52) U.S. Cl. ..................... 711/5; 711/200; 365/230.03
(58) Field of Search ............................. 711/5, 154, 200, 711/214, 217, 168; 365/185.11, 189.04, 230.03, 200

(56) References Cited

U.S. PATENT DOCUMENTS 4,355,376 A * 10/1982 Gould ....................... 365/200
4,926,386 A * 5/1990 Park ....................... 365/230.03

* cited by examiner

Primary Examiner—Nasser Moazzami
(74) Attorney, Agent, or Firm—Conley Rose, P.C.

(57) ABSTRACT

The present invention relates to a memory system, or more particularly to a conflict-free memory system, which can reduce access time to the memory system by supporting simultaneous access to pq units of various data elements of types of 4 directional blocks (pq) and eight directional lines of a constant interval at a location of data within M×N array in a SIMD processor having pq units of PE's (Processing Elements). Accordingly, the present invention is an improvement over the previous memory systems, from the perspective of restriction of subarrary types, constant intervals, and the size of a data array, hardware cost, speed and complexity. Further, it provides a method of address calculation and data routing using said improved conflict-free memory system.

3 Claims, 12 Drawing Sheets

|  | μ=0 | Memory module A for the address differences | | | | | Memory module B for the address differences | | | | | Memory module A for the address differences | | | | | Memory module B for the address differences | | | | | |
|---|---|---|---|---|---|---|---|---|---|---|---|---|---|---|---|---|---|---|---|---|---|---|
|  |  | 0 | 1 | 2 | 3 | 4 | 0 | 1 | 2 | 3 | 4 | 0 | 1 | 2 | 3 | 4 | 0 | 1 | 2 | 3 | 4 |  |
| SEB | 0,1 | 0 | 0 | 0 | 0 | 16 | 0 | 0 | 0 | 0 | 0 | 0 | -1 | 0 | 15 | -1 | 0 | 0 | 0 | 0 | 0 | SWB |
|  | 0,2 | 0 | 17 | 1 | 32 | 16 | 0 | 0 | 0 | 0 | 0 | 0 | 31 | 15 | -1 | 16 | 0 | 0 | 0 | 0 | 0 |  |
|  | 0,3 | 0 | 16 | 18 | 1 | 17 | 0 | 0 | 0 | 0 | 0 | 0 | 16 | -2 | 14 | 46 | 0 | 0 | 0 | 0 | 0 |  |
|  | 0,4 | 0 | 64 | 34 | 32 | 2 | 0 | 0 | 0 | 0 | 0 | 0 | -2 | 62 | 32 | 30 | 0 | 0 | 0 | 0 | 0 |  |
|  | 1,1 | 0 | 0 | 16 | 16 | 16 | 0 | 1 | 0 | 1 | 0 | 0 | 15 | 16 | 15 | -1 | 0 | 1 | 0 | 1 | 1 |  |
|  | 1,2 | 0 | 17 | 1 | 32 | 16 | 0 | 0 | 0 | 0 | 0 | 0 | 31 | 15 | -1 | 16 | 0 | 0 | 0 | 0 | 0 |  |
|  | 1,3 | 0 | 32 | 18 | 1 | 33 | 0 | 0 | 0 | 1 | 1 | 0 | 32 | -2 | 30 | 46 | 0 | 0 | 1 | 1 | 1 |  |
|  | 1,4 | 0 | 64 | 34 | 32 | 2 | 0 | 0 | 0 | 0 | 0 | 0 | -2 | 62 | 32 | 30 | 0 | 0 | 0 | 0 | 0 |  |
| NWB | 0,1 | -1 | -17 | -17 | -17 | -1 | 1 | 1 | 0 | 1 | 0 | 0 | 0 | 0 | -16 | -16 | 0 | 0 | 0 | 0 | 0 | NEB |
|  | 0,2 | -1 | -17 | -33 | -2 | -18 | 1 | 1 | 1 | 1 | 1 | 0 | -16 | 1 | -15 | 16 | 0 | 0 | 0 | 0 | 0 |  |
|  | 0,3 | -1 | -31 | -2 | -49 | -33 | 1 | 0 | 0 | 1 | 1 | 0 | 16 | -31 | 1 | -32 | 0 | 0 | 0 | 0 | 0 |  |
|  | 0,4 | -1 | -3 | -33 | -35 | -65 | 1 | 1 | 1 | 1 | 1 | 0 | -30 | -32 | 32 | 2 | 0 | 0 | 0 | 0 | 0 |  |
|  | 1,1 | -1 | -17 | -1 | -1 | -1 | 1 | 1 | 1 | 1 | 1 | 0 | 0 | 16 | 0 | 0 | 0 | 1 | 0 | 0 | 1 |  |
|  | 1,2 | -1 | -17 | -33 | -2 | -18 | 1 | 1 | 1 | 1 | 1 | 0 | -16 | 1 | -15 | 16 | 0 | 0 | 0 | 0 | 0 |  |
|  | 1,3 | -1 | -18 | -2 | -49 | -17 | 1 | 1 | 1 | 1 | 1 | 0 | 32 | -15 | 1 | -16 | 0 | 0 | 1 | 1 | 0 |  |
|  | 1,4 | -1 | -3 | -33 | -35 | -65 | 1 | 1 | 1 | 1 | 1 | 0 | -30 | -32 | 32 | 2 | 0 | 0 | 0 | 0 | 0 |  |
| EL | 0,1 | 0 | 0 | 1 | 1 | 2 | 0 | 0 | 0 | 0 | 0 | 0 | 17 | 34 | 0 | 17 | 0 | 0 | 0 | 0 | 0 | SEL |
|  | 0,2 | 0 | 3 | 1 | 4 | 2 | 0 | 0 | 0 | 0 | 0 | 0 | 17 | 34 | 51 | 68 | 0 | 0 | 0 | 0 | 0 |  |
|  | 0,3 | 0 | 3 | 6 | 1 | 4 | 0 | 0 | 0 | 0 | 0 | 0 | 102 | 68 | 51 | 17 | 0 | 0 | 0 | 0 | 0 |  |
|  | 0,4 | 0 | 8 | 6 | 4 | 2 | 0 | 0 | 0 | 0 | 0 | 0 | 102 | 34 | 136 | 68 | 0 | 0 | 0 | 0 | 0 |  |
|  | 1,1 | 0 | 0 | 1 | 1 | 2 | 0 | 1 | 0 | 1 | 0 | 0 | 17 | 34 | 16 | 33 | 0 | 0 | 0 | 1 | 1 |  |
|  | 1,2 | 0 | 3 | 1 | 4 | 2 | 0 | 0 | 0 | 0 | 0 | 0 | 17 | 34 | 51 | 68 | 0 | 0 | 0 | 0 | 0 |  |
|  | 1,3 | 0 | 3 | 6 | 1 | 4 | 0 | 0 | 0 | 1 | 1 | 0 | 102 | 84 | 51 | 33 | 0 | 0 | 1 | 0 | 1 |  |
|  | 1,4 | 0 | 8 | 6 | 4 | 2 | 0 | 0 | 0 | 0 | 0 | 0 | 102 | 34 | 136 | 68 | 0 | 0 | 0 | 0 | 0 |  |
| SL | 0,1 | 0 | 16 | 0 | 32 | 16 |  |  |  |  |  | -1 | -1 | 14 | 14 | 29 | 1 | 0 | 1 | 0 | 1 | SWL |
|  | 0,2 | 0 | 64 | 48 | 32 | 16 |  |  |  |  |  | -1 | 44 | 14 | 59 | 29 | 1 | 1 | 1 | 1 | 1 |  |
|  | 0,3 | 0 | 16 | 48 | 64 | 96 |  |  |  |  |  | -1 | 44 | 89 | 14 | 59 | 1 | 1 | 1 | 0 | 0 |  |
|  | 0,4 | 0 | 64 | 128 | 32 | 96 |  |  |  |  |  | -1 | 119 | 89 | 59 | 29 | 1 | 1 | 1 | 1 | 1 |  |
|  | 1,1 | 0 | 32 | 16 | 32 | 16 |  |  |  |  |  | -1 | 15 | 14 | 30 | 29 | 1 | 1 | 1 | 1 | 1 |  |
|  | 1,2 | 0 | 64 | 48 | 32 | 16 |  |  |  |  |  | -1 | 44 | 14 | 59 | 29 | 1 | 1 | 1 | 1 | 1 |  |
|  | 1,3 | 0 | 32 | 48 | 80 | 96 |  |  |  |  |  | -1 | 44 | 89 | 30 | 75 | 1 | 1 | 1 | 1 | 1 |  |
|  | 1,4 | 0 | 64 | 128 | 32 | 96 |  |  |  |  |  | -1 | 119 | 89 | 59 | 29 | 1 | 1 | 1 | 1 | 1 |  |
| WL | 0,1 | -1 | -3 | -2 | -2 | -1 | 1 | 1 | 0 | 1 | 0 | -1 | -34 | -17 | -35 | -18 | 1 | 0 | 0 | 1 | 1 | NWL |
|  | 0,2 | -1 | -3 | -5 | -2 | -4 | 1 | 1 | 1 | 1 | 1 | -1 | -69 | -52 | -35 | -18 | 1 | 1 | 1 | 1 | 1 |  |
|  | 0,3 | -1 | -5 | -2 | -7 | -4 | 1 | 0 | 0 | 1 | 1 | -1 | -34 | -52 | -85 | -103 | 1 | 0 | 1 | 0 | 1 |  |
|  | 0,4 | -1 | -3 | -5 | -7 | -9 | 1 | 1 | 1 | 1 | 1 | -1 | -69 | -137 | -35 | -103 | 1 | 1 | 1 | 1 | 1 |  |
|  | 1,1 |  |  |  |  |  | 1 | 1 | 1 | 1 | 1 | -1 | -18 | -1 | -35 | -18 | 1 | 1 | 1 | 1 | 1 |  |
|  | 1,2 |  |  |  |  |  | 1 | 1 | 1 | 1 | 1 | -1 | -69 | -52 | -35 | -18 | 1 | 1 | 1 | 1 | 1 |  |
|  | 1,3 |  |  |  |  |  | 1 | 1 | 1 | 1 | 1 | -1 | -18 | -52 | -69 | -103 | 1 | 1 | 1 | 1 | 1 |  |
|  | 1,4 |  |  |  |  |  | 1 | 1 | 1 | 1 | 1 | -1 | -69 | -137 | -35 | -103 | 1 | 1 | 1 | 1 | 1 |  |
| NL | 0,1 | 0 | -16 | -32 | -16 | -32 |  |  |  |  |  | 0 | -30 | -31 | -15 | -16 | 0 | 0 | 0 | 0 | 0 | NEL |
|  | 0,2 | 0 | -16 | -32 | -48 | -64 |  |  |  |  |  | 0 | -30 | -60 | -15 | -45 | 0 | 0 | 0 | 0 | 0 |  |
|  | 0,3 | 0 | -96 | -80 | -48 | -32 |  |  |  |  |  | 0 | -76 | -31 | -90 | -45 | 0 | 0 | 0 | 0 | 0 |  |
|  | 0,4 | 0 | -96 | -32 | -128 | -64 |  |  |  |  |  | 0 | -30 | -60 | -90 | -120 | 0 | 0 | 0 | 0 | 0 |  |
|  | 1,1 | 0 | -16 | -32 | 0 | -16 |  |  |  |  |  | 0 | -30 | -15 | -15 | 0 | 0 | 0 | 1 | 0 | 1 |  |
|  | 1,2 | 0 | -16 | -32 | -48 | -64 |  |  |  |  |  | 0 | -30 | -60 | -15 | 0 | 0 | 0 | 0 | 0 | 0 |  |
|  | 1,3 | 0 | -96 | -64 | -48 | -16 |  |  |  |  |  | 0 | -60 | -15 | -90 | -45 | 0 | 1 | 1 | 0 | 0 |  |
|  | 1,4 | 0 | -96 | -32 | -128 | -64 |  |  |  |  |  | 0 | -30 | -60 | -90 | -120 | 0 | 0 | 0 | 0 | 0 |  |

↓ Constant interval r i//p for memory module A or j//q memory module B

FIG. 9 ns and to assign them to the PE's,
CONFLICT-FREE MEMORY SYSTEM AND METHOD OF ADDRESS CALCULATION AND DATA ROUTING BY USING THE SAME

CROSS-REFERENCE TO RELATED APPLICATIONS

The present application claims the benefit of 35 U.S.C. 111(b) Korean provisional patent application No. 2001-48343 filed Aug. 10, 2001, and entitled Conflict-Free Memory System and Method of Address Calculation and Data Routing by Using the Same.

BACKGROUND

1. Field of the Invention

The present invention relates to a memory system, or more particularly to a conflict-free memory system, which can reduce access time to the memory system by supporting simultaneous access to pq units of various data elements of types of four directional blocks (pq) and eight directional lines of a constant interval at a location of data within M×N arrays in a Single-Instruction Multiple-Data (SIMD) stream processor having pq units of PE's (Processing Elements).

2. Description of the Related Art

There have been certain application areas for a Single-Instruction Multiple-Data (SIMD) stream processor which consists of a common control unit, a shared memory module which stores an SIMD command program, and a large number of processing elements (PE's) with a conflict-free (CF) memory system, which can be attached to a host computer with a main memory as shown in FIG. 1.

Some of those application areas are image processing operations, two-way merge sort, successive-doubling Fast Fourier Transform, recursive doubling, and basic matrix operations, M. J. B. Duff, "Computing Structures for Image Processing," *Academic Press*, 1983; J. L. Potter, *IEEE Computer*, vol. 16, No. 1, pp. 62–67, January 1983; K. Preston, Jr., *IEEE Computer*, vol. 16, No. 1, pp. 36–47, January 1983; T. J. Fountain, K. N. Matthews, and M. J. B. Duff, *IEEE Trans. PAMI*, vol. 10, No. 3, pp. 310–319, May 1988; H. S. Wallace and M. D. Howard, *IEEE Trans. PAMI*, vol. 11, No. 3, pp. 227–232, March 1989; L. A. Schmitt and S. S. Wilson, *IEEE Trans. PAMI*, vol. 10, No. 3, pp. 320–330, May 1988; V. Dixit and D. I. Moldovan, *IEEE Trans. PAMI*, vol. 9, No. 1, pp. 153–160, January 1987; L. Uhr, "Parallel Computer Vision," Academic press, 1987;A. Rosenfeld, "Multiresolution Image Processing and Analysis," Springer-Verlag, 1984; G. Y. Kim, "Parallel Memory Architectures for Image Processing and Wavelet-based Video Coding," Ph.D. Thesis, Korea Advanced Institute of Science and Technology (1999); G. A. Baxes, "Digital Image Processing," Prentice-Hall (1984); H. E. Burdick, "Digital Imaging," McGraw-Hill (1997); E. Horowitz and S. Sahni, "Data Structures in Pascal," *Computer Science Press* (1984); J. W. Cooley, P. A. W. Lewis, and P. D. Welch, *IEEE Trans. Educ.*, vol. E-12, No.1, pp. 27–34, 1969; D. T. Harper III and D. A. Linebarger, "Storage Schemes for Efficient Computation of a Radix 2 FFT in a Machine with Parallel Memories," in *Proc. 1988 Int. Conf. Parallel Processing*, 1988; H. S. Stone, "High-performance Computer Architecture," Addison Wesley (1993); D. J. Kuck and R. A. Strokes, *IEEE Trans. Comput.*, vol. C-31, pp.362–376, May 1982, etc. For those applications, after the common control unit of the SIMD computer issues a command to retrieve a set of data elements with a subarray type, base coordinates, and a constant interval between the data elements from the conflict-free memory system and to assign them to the PE's, the control unit issues a command to the PE's to perform the same operation on the different data elements. Therefore, for the efficient utilization of the PE's of the SIMD processor, the important goals of the memory system are as follows:

(1) Various subarray types and constant intervals: The memory system should support simultaneous access to various types of data elements that are related by a constant interval, which is a positive integer except zero.

(2) Simultaneous access with no restriction on the location: The position of the data elements to be accessed simultaneously can be anywhere within a given data array.

(3) Simple and fast address calculation and routing circuitry: The address calculation and routing should be simple and fast.

(4) Simple and fast data routing circuitry: The data routing should be simple and fast.

(5) No burden to the PE's: The address calculation and routing, and data routing should be performed in the memory system without burdening the PE's so that only the interface between the memory system and the PE's is a data register.

(6) Small number of memory modules: The number of memory modules of the memory system should be as small as possible, which is greater than or equal to the number of PE's.

For some time, there has been much research on the storage schemes to increase the utilization of the memory system with multiple memory modules. One of them is to overlap the memory access time of the modules by issuing memory requests sequentially (D. T. Harper III, *IEEE Trans. Parallel Distrib. Syst.*, vol. 2, pp.43–51, January 1991; D. T. Harper III, *IEEE Trans. Comput.*, vol. C-41, pp.227–230, February 1992), which is not adequate to the SIMD processor mentioned above.

A simple storage scheme of the memory system for the SIMD processor is a memory interleaving, which maps an address a to a memory module (a mod m), where m is the number of memory modules in the memory system. Because the number of memory modules of the interleaved storage scheme is the same as that of the PE's of the SIMD processor, which results in a simple implementation of address calculation and routing of the data elements, this scheme has been incorporated in many of the SIMD processors. Unfortunately, the performance of the interleaved storage scheme is relatively low due to conflicts at the memory modules because the interleaved scheme does not support a simultaneous access to various subarray types of data elements that are related by a constant interval, W. Oed and O. Lange, *IEEE Trans. Comput.*, vol. C-34, pp. 949–957, October 1985; D. Baily, *IEEE Trans. Comput.*, vol. C-36, pp. 293–298, March 1987.

Meanwhile, there was a proposal to improve the average performance over the interleaved memory system, but this attempt is not very useful for the SIMD processor because any conflict of the memory requests on the same module delays all of the operations of the PE's of the SIMD processor.

Another class of storage schemes is that of nonlinear schemes investigated by several researchers. Most nonlinear skewing schemes are based on bitwise XOR operations, which were first considered by Batcher, K. Batcher, *IEEE Trans. Comput.*, vol. 26, no. 1, pp. 174–177, 1977. The XOR scheme, which was generalized by Frailong et al., computes the storage location as a dot product of the address of data element and a transformation matrix. In the XOR scheme, it is simple to calculate addresses of data elements and to route them to memory modules, where the number of memory modules is a power of two, but it restricts the subarray types of data elements, constant intervals between the data elements, or the location of the data elements.

The other class of storage schemes is a linear skewing scheme which maps the data element located at (i, j) of a matrix to the memory module (ai+bj) mod m, where a and b are constants and m is the number of memory modules. The linear skewing scheme was first considered by Budnik and Kuck (P. Budnik and D. J. Kuck, *IEEE Trans. Comput.*, vol. C-20, pp.1566–1569, December 1971), and the properties of the schemes were investigated by Shapiro, and Wijshoff and Van Leeuwen, H. Shapiro, *IEEE Trans. Comput.*, vol. C-27, no. 5, pp. 421–428, May 1978; H. Wijshoff and J. Van Leeuwen, *IEEE Trans. Comput.*, vol. C-34, no. 6, pp. 501–505, June 1985; H. Wijshoff and J. Van Leeuwen, *IEEE Trans. Comput.*, vol. C-36, no. 2, pp. 233–239, February 1987. Budnik and Kuck, Shapiro, Wijshoff and Van Leeuwen, and Lawrie proved that a memory system can access data elements simultaneously without conflicts within a block, a row, a column, a forward-diagonal, or a backward-diagonal subarray if the number of memory modules is a prime number greater than the number of data elements, D. H. Lawrie, *IEEE Trans. Comput.*, vol. C-24, no. 12, pp. 1145–1155, December 1975. The drawback of the linear skewing schemes is either the address calculation, address routing, and data routing are complex and slow when the address calculation is incorporated with the m memory modules, or the number of the memory modules is twice the number of the data elements accessed simultaneously in order to avoid the slow modulo (m) calculations for the case that the number of data elements is a power of two.

Tables 1(a) and 1(b) show the class of storage schemes, linearity, routing method, subarray types, constant intervals, the hardware implementation, simultaneity, location of access, the burden to the PE's, and the number of memory modules of the previous memory systems and the memory system proposed in the present invention for the SIMD processor to fulfill the goals (1)–(6) by using a linear skewing scheme, (1) D. T. Harper III, "Block, Multistride Vector, and FFT Accesses in Parallel Memory Systems," *IEEE Trans. Parallel Distrib. Sys.*, vol. 2, pp. 43–51, January 1991; (2) D. T. Harper III, "Increased Memory Performance during Vector Accesses through the Use of Linear Address Transformations," *IEEE Trans. Comput.*, vol. C-41, pp. 227–230, February 1992; (3) W. Oed and O. Lange, "On the Effective Bandwidth of Interleaved Memories in Vector Processing Systems," *IEEE Trans. Comput.*, vol. C-34, pp. 949–957, October 1985; (4) D. T. Harper III and J. R. Jump, "Vector Access Performance in Parallel Memories Using a Skewed Storage Scheme," *IEEE Trans. Comput.*, vol. C-36, pp. 1440–1449, December 1987; (5) R. Raghavan and J. P. Hayes, "On Randomly Interleaved Memories," *Supercomputing '90*, pp. 49–58, 1990; (6) K. Batcher, "The Multidimensional Access Memory in STARAN," *IEEE Trans. Comput.*, vol 26, no. 1, pp. 174–177, 1977; (7) J. Frailong, W. Jalby, and J. Lenfant, "XOR-schemes: A Flexible Data Organization in Parallel Memories," in *Proc. Int. Conf. Parallel Processing*, pp. 276–283, 1985; (8) A. Norton and E. Melton, "A Class of Boolean Linear Transformations for Conflict-free Power-of-two Stride Access," in *Proc. Int. Conf. Parallel Processing*, pp. 247–254, 1987; (9) D. Lee, "Scrambled Storage for Parallel Memory Systems," in *Proc. Int. Symp. on Comp. Architecture*, pp. 232–239, 1988; (10) K. Kim and V. K. P. Kumar, "Perfect Latin Squares and Parallel Array Access," in *Proc. Int. Symp. on Comp. Architecture*, pp. 372–379, 1989; (11) C. S. Raghavendra and R. Boppana, "On Methods for Fast and Efficient Parallel Memory Access," in *Proc. Int. Conf. Parallel Processing*, pp. 76–83, 1990; (12) 32. D. T. Harper III, "A Multiaccess Frame Buffer Architecture," *IEEE Trans. Comput.*, Vol. C-43, pp. 618–622, May 1994; (13) P. Budnik and D. J. Kuck, "The Organization and Use of Parallel Memories," *IEEE Trans. Comput.*, vol. C-20, pp. 1566–1569, December 1971; (14) H. Wijshoff and J. Van Leeuwen, "On Linear Skewing Schemes and d-ordered Vectors," *IEEE Trans. Comput.*, vol. C-36, no. 2, pp. 233–239, February 1987 (15) D. H. Lawrie, "Access and Alignment of Data in an Array Processor." *IEEE Trans. Comput.*, vol. C-24, no. 12, pp. 1145–1155, December 1975; (16) D. C. Van Voorhis and T. H. Morrin, "Memory Systems for Image Processing," *IEEE Trans. Comput.*, vol. C-27, pp. 113–125, February 1978; (17) J. W. Park, "An Efficient Memory System for Image Processing," *IEEE Trans. Comput.*, vol. C-35, pp. 669–674, July 1986; "An Efficient Memory System for Image Processing," Korean Patent No. 32719 (1990); "Memory System for Image Processing Having Address Calculating Circuitry Permitting Simultaneous Access to Block, Horizontal Sequence and Vertical Sequence Subarrays of an Array Data," U.S. Pat. No. 4,926,386 (1990); (18) D. H. Lawrie and C. R. Vora, "The Prime Memory System for Array Access," *IEEE Trans. Comput.*, vol. C-31, pp. 435–442, May 1982; (19) D. T. Harper III and D. A. Linebarger, "Conflict-free Vector Access Using a Dynamic Storage Scheme," *IEEE Trans. Comput.*, vol. C-40, no. 3, pp. 276–283, March 1991; (20) A Deb, "Multiskewing—A Novel Technique for Optimal Parallel Memory Access," *IEEE Trans. Parallel Distrib. Syst.*, Vol. 7, No. 6, pp. 595–604, June 1996; (21) J. W. Park and D. T. Harper III, "Memory Architecture Support for the SIMD Construction of a Gaussian Pyramid," *IEEE Symp. Parallel and Distributed Processing*, pp. 444–451, December 1992; (22) J. W. Park and D. T. Harper III, "An Efficient Memory System for the Construction of a Gaussian pyramid," *IEEE Trans. Parallel Distrib. Syst.*, vol. 7, No. 8, pp. 855–860, August 1996; (23) J. W. Park, "Efficient Image Analysis and Processing Memory System," Korean Patent No. 58542 (1993); "Efficient Image Analysis and Processing Memory System," Japanese Patent No. 2884815 (2000); (24) J. W. Park, "Multi-access Memory System with the Constant Interval for Image Processing," Korean Patent No. 121295 (1997).

TABLE 1(a)

| Storage Scheme | Linearity | Routing Method | Subarray Type[2] | Constant Interval | HW[1] | Simul- taneity | Location of Access | Burden to PE's | # Memory |
|---|---|---|---|---|---|---|---|---|---|
| Overlapping Scheme by Harper (1) | Nonlinear | Not Mentioned | B, R, C | Arbitrary positive integer* | Yes | No | Arbitrary | Address Calcula- tion | pq |

TABLE 1(a)-continued

| Storage Scheme | Linearity | Routing Method | Subarray Type[2] | Constant Interval | HW[1] | Simultaneity | Location of Access | Burden to PE's | # Memory |
|---|---|---|---|---|---|---|---|---|---|
| XOR Scheme by Harper (2) | Nonlinear | Not Mentioned | R | Arbitrary positive integer* | Yes | No | Arbitrary | No | pq |
| Interleaved Scheme by Oed and Lange (3) | Linear | Shifting | R | Arbitrary positive integer* | Yes | Yes | Arbitrary | No | pq |
| Skewed Storage Scheme by Harper, et al. (4) | Linear | Not Mentioned | R | Arbitrary positive integer* | Yes | No | Arbitrary | No | pq |
| Scheme by Raghavan, et al. (5) | Linear | Not Mentioned | R | Arbitrary positive integer* | No | No | Arbitrary | No | pq |
| XOR Scheme by Batcher (6) | Nonlinear | Perfect Shuffle | R, C | 1 | Yes | Yes | Arbitrary | No | pq |
| XOR Scheme by Frailong, et al. (7) | Nonlinear | Omega | R, C, B | Arbitrary positive integer* (row, column), 1(block) | No | Yes | Restricted | No | pq |
| XOR Scheme by Norton, et al. (8) | Nonlinear | Inverted Baseline | R | Power of two | Yes | Yes | Restricted | Address Calculation | pq |
| Lee (9) | Nonlinear | Theta | R, C, SB, DB | 1 | No | Yes | Arbitrary | No | pq |
| Kim and Kumar (10) | Nonlinear | Not Mentioned | R, C, FD | 1 | Yes | Yes | Restricted | No | |
| Raghavendra Boppana (11) | Nonlinear | Omega | R, C, FD, SB | 1 | No | Yes | Restricted | Address Calculation | pq |
| XOR Scheme by Harper (12) | Nonlinear | Crossbar | R, C, Various types of blocks | 1 | Yes | Yes | Restricted | No | pq |

[1]HW denotes hardware implementation;
*Arbitrary positive integers are used except for the integral multiples of the number of memory modules.

TABLE 1(b)

| Storage Scheme | Linearity | Routing Method | Subarray Type | Constant Interval | HW[1] | Simultaneity | Location of Access | Burden to PE's | # Memory |
|---|---|---|---|---|---|---|---|---|---|
| Budnik and Kuck (13) | Linear | Not Mentioned | R, C, B, FD, BD | 1 | No | Yes | Arbitrary | No | Prime (>pq) |
| Wijshoff (14) | Linear | Not Mentioned | R, C, FD, BD | Not mentioned | No | Yes | Arbitrary | Not mentioned | Prime (>pq) |
| Lawrie (15) | Linear | Omega | R, C, FD, BD | 1 | No | Yes | Arbitrary | No | 2N (for NxM matrix) |
| Van Voorhis and Morrin (16) | Linear | Multiplexing and Rotation | R, C, B | 1 | Yes | Yes | Arbitrary | No | $pq^{+1}$, $pq^2$, $2pq$ |
| Park (17) | Linear | Multiplexing and Rotation | R, C, B | 1 | Yes | Yes | Arbitrary | No | $pq^{+1}$ |
| Lawrie and Vora (18) | Linear | Crossbar | R, C, FD, BD | Arbitrary positive integer* | Yes | Yes | Arbitrary | No | Prime (>pq) |
| Harper and Linebarger (19) | Linear | No need | R | Arbitrary positive integer* | Yes | No | Arbitrary | No | pq |
| Skewed Storage Scheme by Deb (20) | Linear | Shifting | R, C, FD | 1 | No | Yes | Arbitrary | No | pq |
| Park and Harper (21) | Linear | Multiplexing and Rotation | R, C, B | 2(row), 1(column), 1(block) | Yes | Yes | Arbitrary | No | $pq^{+1}$ |
| Park (22) | Linear | Multiplexing and Rotation | R, C, B | Power of two(row), 1(column), 1(block) | Yes | Yes | Arbitrary | No | $pq^{+1}$ |

TABLE 1(b)-continued

| Storage Scheme | Linearity | Routing Method | Subarray Type | Constant Interval | HW[1] | Simul- taneity | Location of Access | Burden to PE's | # Memory |
|---|---|---|---|---|---|---|---|---|---|
| Park (23) | Linear | Multiplexing and Rotation | B, 8-DL, line of interval multiple of 5° | 1 | Yes | Yes | Arbitrary | No | $pq+1$ |
| Park (24) | Linear | Multiplexing and Rotation | B, R, C, FD, BD | Arbitrary* | Yes | Yes | Arbitrary | No | $pq+1$ |
| Present Invention | Linear | Multiplexing and Rotation | 4-DB, 8-DL | Arbitrary positive integer* | Yes | Yes | Arbitrary | No | Prime (>pq) |

[1]HW denotes hardware implementation;
*Arbitrary positive integers are used except for the integral multiples of the number of memory modules.

For the following image processing operations, a simultaneous access to image points within the block, row, column, forward-diagonal, or backward-diagonal subarray is required for the SIMD processor in order to reduce the overall memory access time, G. Y. Kim, "Parallel Memory Architectures for Image Processing and Wavelet-based Video Coding," Ph.D. Thesis, Korea Advanced Institute of Science and Technology (1999). For the point operations such as arithmetic and logic operations, it is required that PE's are assigned to the corresponding image points within a block, row, or column subarray in order to perform the arithmetic and logic operations in parallel, G. A. Baxes, "Digital Image Processing," Prentice-Hall, 1984. For the wavelet transform, a memory system to access image points within a row and a column subarray is required, K. R. Castleman, "Digital Image Processing," Prentice-Hall, 1996; S. Mallat, *IEEE Trans. PAMI*, vol. 11, No. 7, pp. 674–693, July 1989. For the neighborhood operations such as edge detection, convolution, or low (high)-pass filters on an image of $2^{n_1} \times 2^{n_1}$ by $2^{n_2} \times 2^{n_2}$ PE's, where n1>n2, by using 3×3 or 4×4 edge masks, it is required that each PE is assigned to one 3×3 or 4×4 block and a memory system accesses $2^{n_2} \times 2^{n_2}$ block with a constant interval of 3 or 4, G. A. Baxes, "Digital Image Processing," Prentice-Hall, 1984; H. E. Burdick, "Digital Imaging," McGraw-Hill, 1997; J. R. Parker, "Algorithms for Image Processing and Computer Vision," John Wiley & Sons, 1997; D. H. Ballard and C. M. Brown, "Computer Vision," Prentice-Hall, 1982; J. S. Lim, "Two-dimensional Signal and Image Processing," Prentice-Hall, 1990. For the 8×8 Discrete Cosine Transform of an image of $2^{n_1} \times 2^{n_1}$ that are performed by $2^{n_2} \times 2^{n_2}$ PE's, where n1>n2, it is required that each PE is assigned to one 8×8 block and a memory system accesses $2^{n_2} \times 2^{n_2}$ block with a constant interval of 8, Discrete Cosine Transform, K. R. Rao and P. Yip, "Discrete Cosine Transform," Academic Press, 1990. For the fast comparison of one 16×16 block within the previous image and the other 16×16 block within the reference one for the motion estimation, it is required that a memory system access block subarrays whose constant intervals are 1, 2 and 4, J. S. Lim, "Two-dimensional Signal and Image Processing," Prentice-Hall, 1990. For the progressive transmission using 2×2 or 3×3 subsampling method, a simultaneous access to data elements within a block subarray whose constant interval is $2^l$ or $3 \cdot 2^l$ is required in order to reduce the memory access time, where l is a positive integer, W. Y. Kim, P. T. Balsara, D. T. Harper, and J. W. Park, *IEEE Trans. Circuits and Systems for Video Technology*, vol. 5, No.1, pp.1–13, February 1995.

Another example is a fast construction of a Gaussian pyramid or the Hierarchical Discrete Correlation window function, which is useful for compression, texture analysis, or motion analysis, A. Rosenfeld, "Multiresolution Image Processing and Analysis," Springer-Verlag, 1984; P. J. Burt, *Comput. Vision, Graphics, Image processing* 16, pp.20–51, 1981; P. J. Burt, *Comput. Vision, Graphics, Image processing* 21, pp.368–382, 1983. The value of every other node of the previous level or every $2^l$th node of the level 0 should be assigned to each PE in the SIMD processor in order to compute the level k recursively or directly, respectively. Therefore, a conflict-free memory system that support simultaneous access to the image points within a block or a row with constant interval $2l, l \geq 0$ at an arbitrary position is required for the reduction of the overall memory access time for the construction of a Gaussian pyramid, J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996. For the case that the number of nodes of a row of the target level image is less than that of PE's, a simultaneous access to image points within the block subarray is more useful than the row subarray. Also, for the fast rotation of a subimage by a multiple of 90° or for a mirror image, it is required that a memory system accesses image points within four directional blocks, which is further explained below. For the fast rotation of a subimage by a multiple of 45° or by a multiple of 5°, it is required that a memory system accesses image points within an eight-directional line, J. W. Park, "Efficient Image Analysis and Processing Memory System," Korean Patent No. 58542 (1993); "Efficient Image Analysis and Processing Memory System," Japanese Patent No. 2884815 (2000); J. W. Park, S. R. Maeng, and J. W. Cho, *Int. J. of High Speed Computing*, vol. 2, No. 4, pp.375–385, December 1990.

For the following two-way merge sort algorithm, successive-doubling FFT algorithm, recursive doubling algorithm, and matrix and signal processing operations, a memory system which supports simultaneous access to data elements within the block, row, column, forward-diagonal, and backward-diagonal subarray is required for the SIMD processor in order to reduce the overall memory access time.

The two-way merge sort begins with the input of n sorted date files, each of length 1. These n data files are merged to obtain n/2 files of size 2. These n/2 data files are then merged and so on until only one data file is left. Therefore, a memory system which accesses to data elements within a row of constant interval $2l, l > 0$, is useful for the fast two-way merge sort by the SIMD processor.

For the successive-doubling FFT algorithm by the SIMD processor, a memory system that can access to data elements within a row of constant interval $2l, l > 0$, is useful in order to reduce the memory access time, J. W. Cooley, P. A. W. Lewis, and P. D. Welch, *IEEE Trans. Educ.*, vol. E-12, No.1, pp. 27–34, 1969; D. T. Harper III and D. A. Linebarger, in *Proc. 1988 Int. Conf Parallel Processing*, 1988.

For the recursive doubling algorithm to perform addition, multiplication, maximum, minimum, AND, OR, and XOR operations, a memory system that can access to data elements within a row of constant interval 2l, l>0, is useful in order to reduce the memory access time, H. S. Stone, "High-performance Computer Architecture," Addison Wesley, 1993. The matrix operations of addition, multiplication, and determinant benefit from a simultaneous access to data elements within a block, row, column, forward-diagonal, and backward-diagonal subarrays. Also, for the speedup of various matrix operations for signal processing by the SIMD processor, a conflict-free memory system which supports a simultaneous access to data elements within a block, row, column, forward-diagonal, or backward-diagonal subarray is required in order to reduce the overall memory access time, J. S. Lim, "Two-dimensional Signal and Image Processing," Prentice-Hall, 1990; D. H. Johnson and D. E. Dudgeon, "Array Signal Processing," Prentice-Hall, 1993.

An SIMD processor with pq PE's and a memory system with m memory modules, pq requests are presented at the same time, each to a different memory module. After a memory access time, the pq requests are completed and all memory modules are freed to operate on subsequent requests, where the requests should not place restriction on the locations of data elements within a data array. In order to reduce the memory access time of the memory system and in order to speed up the processing time of the image processing operations, two-way merge sort algorithm, successive-doubling FFT algorithm, recursive doubling algorithm, and many matrix and signal processing operations consequently, the memory system should support simultaneous access to pq data elements within a block, row, column, forward-diagonal, or backward-diagonal subarray with a constant interval r in a data array $I(*,*)$. If the constant interval can be a positive or a negative integer, it is convenient to consider the following 12 subarray types (four directional blocks: South-East Block (SEB), South-West Block (SWB), North-West Block (NWB), North-East Block (NEB); and eight directional lines: East Line (EL), South-East Line (SEL), South Line (SL), South-West Line (SWL), West Line (WL), North-West Line (NWL), North Line (NL), North-East Line (NEL)) with base coordinates (i, j) and a positive constant interval r:

$$SEB(i,j,r)=\{I(i+a r,j+b r)|0\leq a<p,0\leq b<q\},\ 0\leq i\leq M-rp,\ 0\leq j\leq N-rq \quad (1)$$

$$SWB(i,j,r)=\{I(i+a r,j-b r)|0\leq a<p,0\leq b<q\},\ 0\leq i\leq M-rp, rq\leq j\leq N \quad (2)$$

$$NWB(i,j,r)=\{I(i-a r,j-b r)|0\leq a<p,0\leq b<q\}, rp\leq i\leq M, rq\leq j\leq N \quad (3)$$

$$NEB(i,j,r)=\{I(i-a r,j+b r)|0\leq a<p,0\leq b<q\}, rp\leq i\leq M,0\leq j\leq N-rq \quad (4)$$

$$EL(i,j,r)=\{I(i,j+ar)|0\leq a<pq\},0\leq i\leq M,\ 0\leq j\leq N-rpq \quad (5)$$

$$SEL(i,j,r)=\{I(i+a r,j+ar)|0\leq a<pq\}0\leq i\leq M-rpq,0\leq j\leq N-rpq \quad (6)$$

$$SL(i,j,r)=\{I(i+a r,j)|0\leq a<pq\},0\leq i\leq M-rpq,0\leq j\leq N \quad (7)$$

$$SWL(i,j,r)=\{I(i+a r,j-ar)|0\leq a<pq\},0\leq i\leq M-rpq, rpq\leq j\leq N \quad (8)$$

$$WL(i,j,r)=\{I(i,j-ar)|0\leq a<pq\},0\leq i\leq M, rpq\leq j\leq N \quad (9)$$

$$NWL(i,j,r)=\{I(i-a r,j-ar)|0\leq a<pq\}, rpq\leq i\leq M, rpq\leq j\leq N \quad (10)$$

$$NL(i,j,r)=\{I(i-a r,j)|0\leq a<pq\}, rpq\leq i\leq M,0\leq j\leq N \quad (11)$$

$$NEL(i,j,r)=\{I(i-a r,j+ar)|0\leq a<pq\}, rpq\leq i\leq M,0\leq j\leq N-rpq, \quad (12)$$

where the constant interval r is a positive integer.

The 12 subarray types (1)–(12) with a constant interval r and the base coordinates (i,j) are represented in FIGS. 2(*a*) and 2(*b*). FIG. 2(*a*) shows four direction blocks (SEB, SWB, NWB, NEB), and FIG. 2(*b*) shows eight direction lines (EL, SEL, SL, SWL, WL, NWL, NL, NEL).

FIG. 3 shows a block diagram of a general design of the conflict-free memory system with an SIMD processor, where the interface is a data register. When a subarray is stored, the components of the memory system perform the following operations sequentially under the control of the control circuitry according to the request of the SIMD processor:

(1) t, i, j and r registers are set by the SIMD processor to indicate the subarray type, base coordinates, and constant interval of the required subarray (1)–(12), and the subarray itself is placed in the data register in a modified row major order, where $k=a\cdot q+b, 0\leq k<pq$. For example, the four data elements of SEB(14,15,2) in a modified row major order are I(14,15),I(14,17),I(16,15),I(16,17); the four data elements of SWB(14,15,3) in a modified row major order are I(14,15),I(14,12),I(17,15),I(17,12); the four data elements of NWL(14,15,3) in a modified row major order are I(11,12),I(8,9),I(5,6),I(2,3).

(2) The address calculation and routing circuitry computes the m addresses of the data elements within the subarray, and routes them to the m memory modules;

(3) The memory module selection circuitry enables the pq memory modules to be accessed;

(4) The data routing circuitry routes the subarray in the data register to the m memory modules; and (5) A WRITE signal causes pq data elements within the subarray to be stored in the pq enabled memory modules, where the operations (2), (3) and (4) are performed in parallel.

Similarly, when a subarray is to be retrieved from the memory system, the components of the memory system perform the following operations sequentially:

(1) t, r, i and j registers are set;

(2) The address calculation and routing circuitry computes the m addresses of the data elements within the subarray, and routes them to the m memory modules;

(3) The memory module selection circuitry enables the pq memory modules to be accessed;

(4) A READ signal causes the pq data elements within the subarray to be retrieved from the pq enabled memory modules; and (5) The data routing circuitry routes the data elements from the m memory modules to the data register, and arranges the data elements within one of the subarrays (1)–(12) in the modified row major order, where the operations (2) and (3) are performed in parallel.

In order to distribute the data elements of the M×N array $I(*,*)$ among the m memory modules, a memory module assignment function must place in distinct memory modules the data elements that are to be accessed simultaneously. Also, an address assignment function must allocate different addresses to data elements assigned to the same memory module.

SUMMARY OF THE INVENTION

The objective of the present invention is to provide a conflict-free memory system, which comprises a simple and fast address calculation and routing circuitry.

Another objective of the present invention is to provide a conflict-free memory system, which can reduce access time to the memory system by supporting simultaneous access to pq units of various data elements of types of four directional blocks (pq) and eight directional lines of a constant interval at an arbitrary location of data within M×N array.

Another objective of the present invention is to provide an enhanced conflict-free memory system, as compared to the conventional memory systems, in terms of access types (subarray types) to data, intervals, size restriction on data arrays, cost and speed of hardware, etc.

In order to achieve these objectives, the conflict-free memory system according to the present invention, in relation to a conflict-free memory system, which can reduce access time to the memory system of a Single-Instruction Multiple-Data (SIMD) stream processor having pq units of processing elements (PE's), which comprises m units of memory modules (m>pq); an address calculation and routing circuitry, which computes the m addresses of the data elements and routes them to the m memory modules; a memory module selection circuitry, which selects the pq memory modules to be accessed; a data register, which stores designated subarray types, base coordinates and interval information required for the subarray types; a data routing circuitry, which routes the data in said data register to the m memory modules, wherein said conflict-free memory system supports simultaneous access to pq data elements of access types of four directional blocks (South-East Block (SEB), South-West Block (SWB), North-West Block (NWB), North-East Block (NEB)), at any location within data arrays, so related with a positive interval; or eight directional lines (East Line (EL), South-East Line (SEL), South Line (SL), South-West Line (SWL), West Line (WL), North-West Line (NWL), North Line (NL), North-East Line (NEL)).

In particular, the conflict-free memory according to the present invention comprises an address calculation and routing circuitry having four 5×1 multiplexers, which receive base coordinates, subarray types and interval information; first and second SRAM's for pre-sorting and storing address differences; a third SRAM for (i/p)s values; m+3 adders consisting of two adders which supply the output values of said multiplexers to said first and second SRAM's, an adder which receives output values from said third SRAM for addition, and m adders; a barrel shifter which supplies output of said m adders to m memory modules according to the rotation signals of said data routing circuitry.

BRIEF DESCRIPTION OF THE DRAWINGS

FIG. 6 is shows the memory module numbers assigned by the memory module function, $\mu(i,j)=(iq+j)\%m$, p=q=2, M×N=32×32, and m=5.

FIG. 7 shows the addresses assigned by the address assignment function, $\alpha(i,j)=(i/p)s+j/q$, to each data element for p=q=2, M×N=32×32, s=16.

FIG. 9 shows the contents of memory modules A and B for the address differences for p=q=2, M×N=32×32, s=16.

BEST MODE FOR CARRYING OUT THE INVENTION

Figure 1:
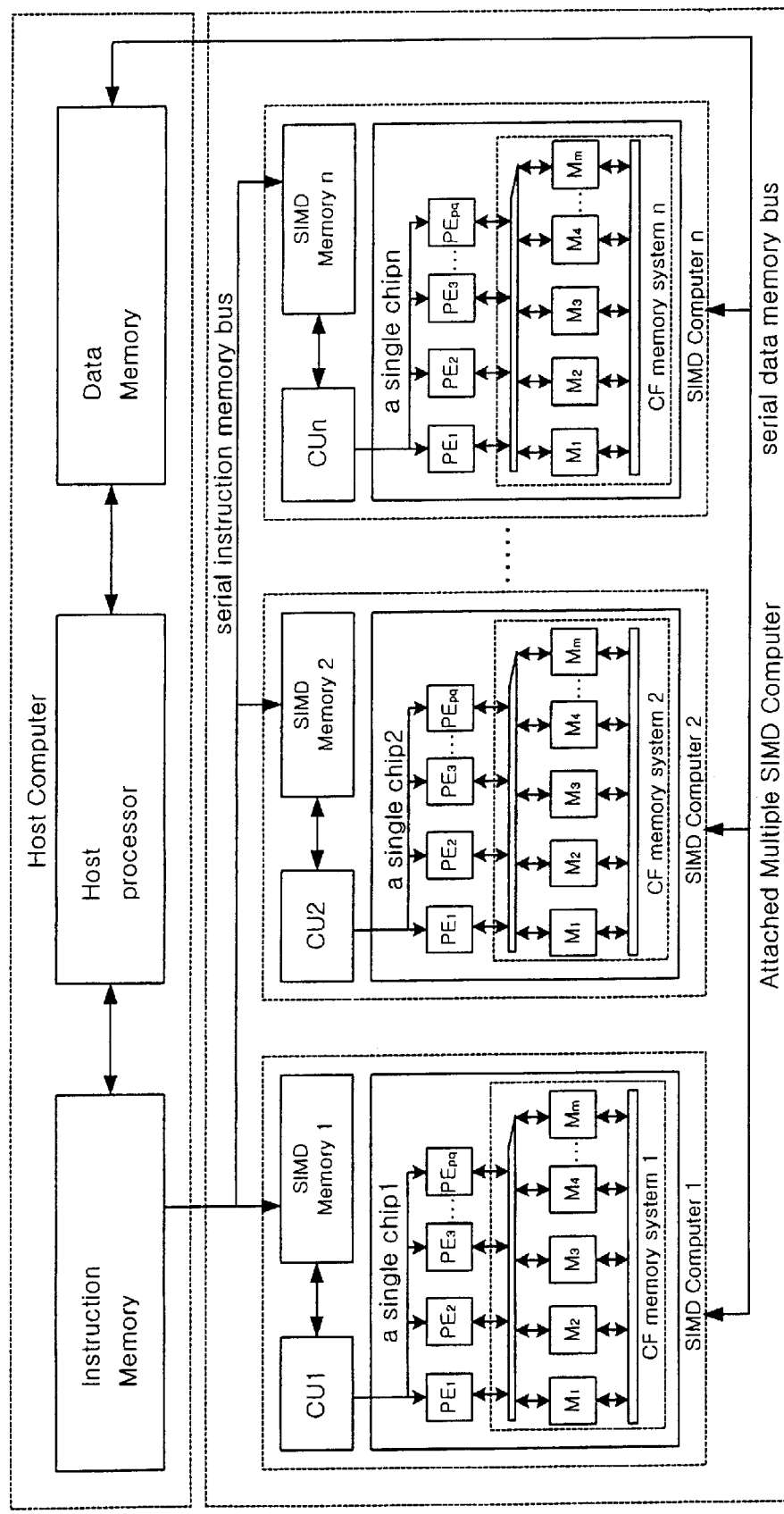
FIG. 1 is a drawing which shows the relationship between a main computer and an attached multiple SIMD computer.
Figure 2A:
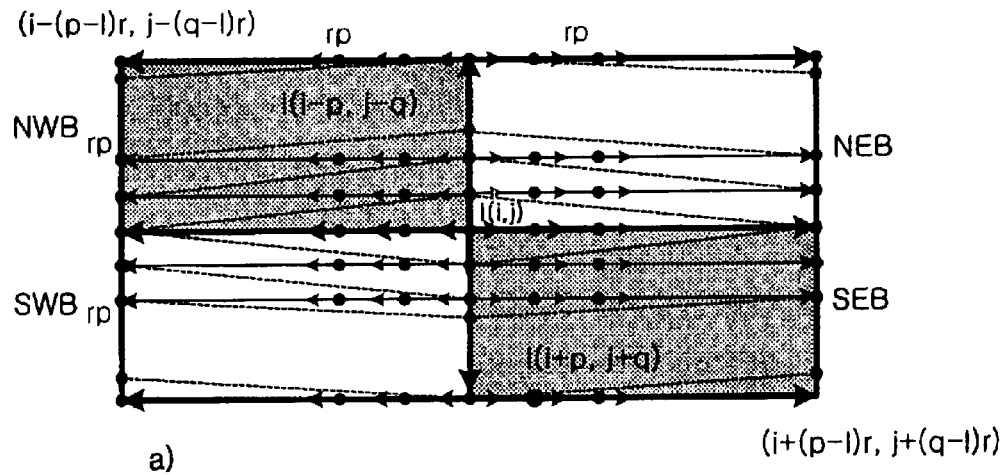
FIG. 2(a) is a drawing of access types, intervals, and base coordinates of four direction blocks.
Figure 2B:
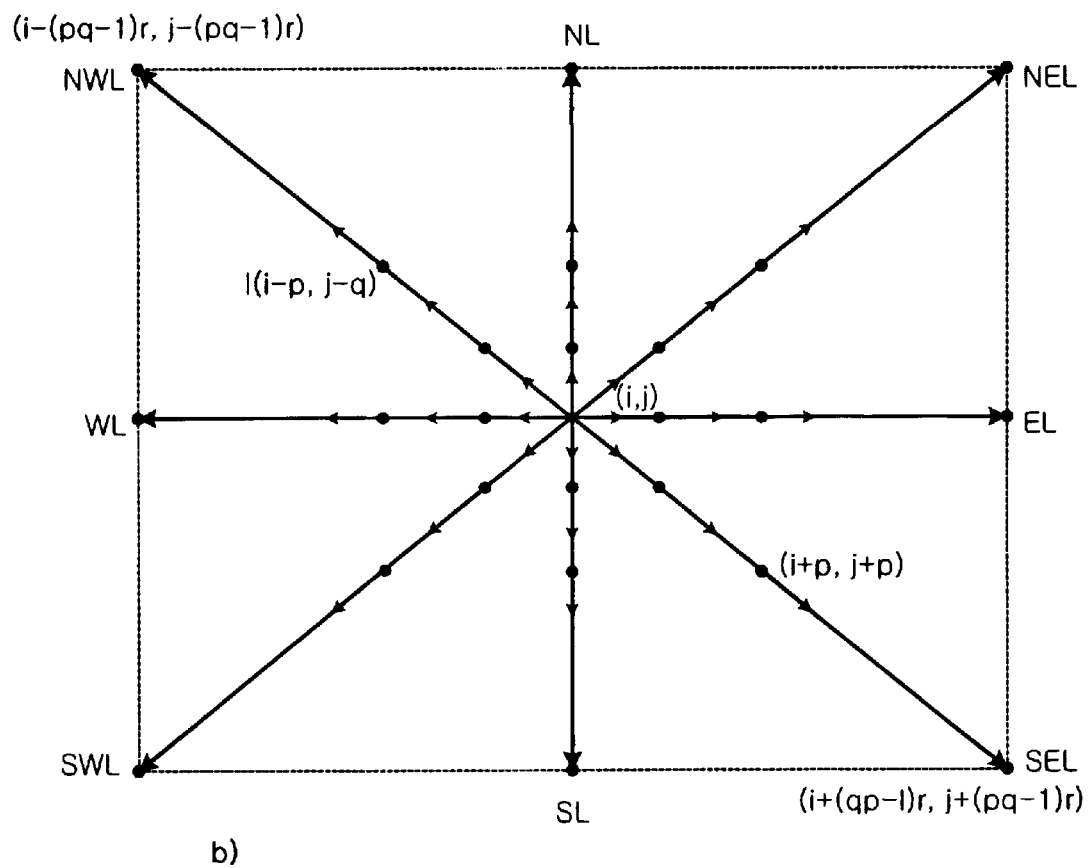
FIG. 2(b) is a drawing of access types, intervals, and base coordinates of eight direction lines.
Figure 3:
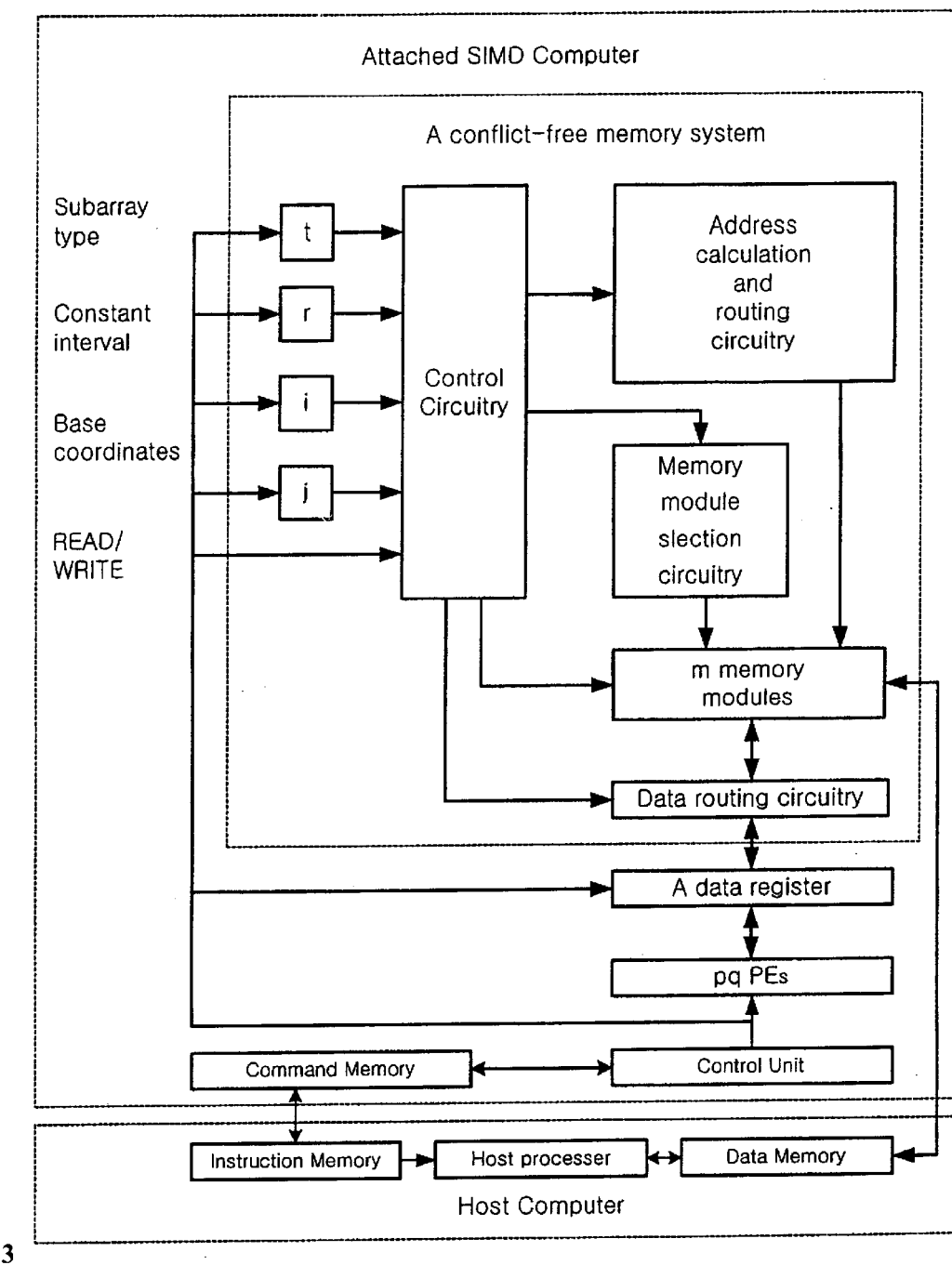
FIG. 3 is a drawing of general design of a conflict-free memory system.
Figure 4:
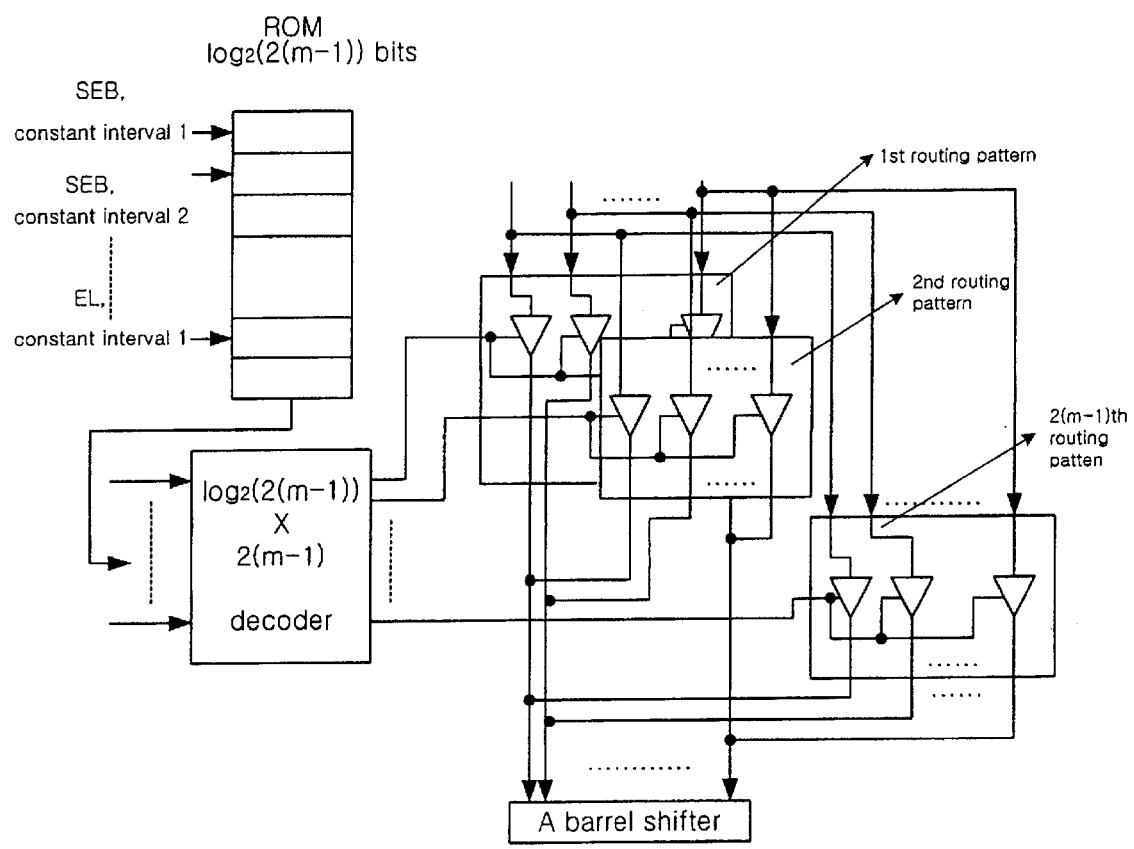
FIG. 4 is a detailed schematic of a data routing circuitry.

The construction of a conflict-free memory system according to the present invention and the method of address calculation and data routing using said memory system are described as below with references to attached figures.

A memory module assignment function which determines the index of memory module of a data element is as follows:

$$\mu(i,j)=(iq+j)\%m \tag{13}$$

The memory module assignment function (13) has been considered by Van Voorhis and Morrin for m=pq+1, 2pq, pq², and Park and Park and Harper for m=pq+1, D. C. Van Voorhis and T. H. Morrin, *IEEE Trans. Comput.*, vol. C-27, pp.113–125, February 1978; J. W. Park, *IEEE Trans. Comput.*, vol. C-35, pp.669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996.

The following Theorem 1 shows the accessibility of the above function (13) for the 12 subarray types (1)~(12).

Theorem 1: The memory module assignment function, (i, j) with m>pq, places in pq distinct memory modules the pq elements within a South-East Block (SEB), South-West Block (SWB), North-West Block (NWB), North-East Block (NEB)), East Line (EL), South-East Line (SEL), South Line (SL), South-West Line (SWL), West Line (WL), North-West Line (NWL), North Line (NL), North-East Line (NEL) subarray, whose constant interval is r, where r%m≠0.

The address assignment function which determines the address of a data element within a memory module is as follows:

$$\alpha(i,j)=(i/p)s+j/q \tag{14}$$

Here, s is any integer greater than or equal to $\lceil N/q \rceil$ and '/' means integer division. This function has been considered by Van Voorhis, Morrin, Park and Harper, D. C. Van Voorhis and T. H. Morrin, *IEEE Trans. Comput.*, vol. C-27, pp.113–125, February 1978; J. W. Park, *IEEE Trans. Comput.*, vol. C-35, pp.669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996.

In the index numbers of the memory modules and the addresses of the data elements within the subarray (1)–(12) can be arranged in the modified row major order, where k=a·q+b, 0≤k<pq, the memory modules assignment function (13) and the address assignment function (14) can be represented as follows:

$$\mu(k)=(\mu(0)+\mu'(k))\%m,\ 0 \le k < pq \tag{15}$$

Here, $\mu(0)$ is (i, j) of (13).

$$\alpha(k)=\alpha(0)+\alpha'(k), 0 \leq k<pq \qquad (16)$$

Here, $\alpha(0)$ is $\alpha(i, j)$, which is the base address of (14).

The computation of the addresses of the data elements within the subarray in memory modules, $\alpha(\mu), 0 \leq \mu<m$, directly is very slow and costly, D. C. Van Voorhis and T. H. Morrin, *IEEE Trans. Comput.*, vol. C-27, pp.113–125, February 1978; D. H. Lawrie and C. R. Vora, *IEEE Trans. Comput.*, vol. C-31, pp.435–442, May 1982. The computation of the addresses of the data becomes less complex by separating the address calculation from the address routing. In the memory systems by Park, and Park and Harper, the address differences, $\alpha'(k)$ ($=\alpha(k)-\alpha(0)$), are first calculated, and then those addresses differences are added to the base address, $\alpha(0)$, to achieve the address, $\alpha(k)$ of (16), J. W. Park, *IEEE Trans. Comput.*, vol. C-35, pp.669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996.

Finally, the addresses, $\alpha(k)$, are routed to the memory modules. The drawback of the address calculation and routing method is that because the routing patterns are dependent upon the subarray type and the constant interval, the address routing circuitry becomes very complex when the number of the subarray types and the constant intervals are increased.

In the present invention, a new address calculation and routing method is proposed, in which the address differences, $\alpha'(k)$, are prearranged into the ascending order according to the index numbers of memory modules from the index number of memory module of the first element of the required subarray, $\mu(0)$, so that after the addition of the address differences to the base address, only the right-rotation by $\mu(0)$ is required for all the 12 subarray types and constant intervals (1)~(12).

In order to get $\mu'(k)$ and $\alpha'(k)$, the above expressions (15)~(16) are changed as follows:

$$\mu'(k)=\mu((k)-\mu(0))\%m, 0 \leq k<pq \qquad (17)$$

$$\alpha'(k)=\alpha(k)-\alpha(0), 0 \leq k<pq \qquad (18)$$

For the case that $\mu'(k)=(\lambda \cdot k)\%m$, $$k=(\mu'(k)\lambda')\%m=((\mu(k)-\mu(0))\lambda')\%m \qquad (19)$$

Here, the equation of $\lambda\lambda'=1\%m$ is applied.

By substituting $((\mu(k)-\mu(0))\cdot\lambda')\%m$ instead of k into (18), we get $\alpha'(k)$ as follows:

$$\alpha'(k)=\alpha'(((\mu(k)-\mu(0))\cdot\lambda')\%m)=\alpha(((\mu(k)-\mu(0))\cdot\lambda).\ '\%m)-\alpha(0),$$
$$0 \leq k<pq \qquad (20)$$

The $\alpha'(k), 0 \leq k<pq$, are pq addresses differences of the pq data elements used in the memory systems, which are arranged in the modified row major from the data elements of the base coordinates (i,j) within the subarray. By arranging the address differences (20) according to the index number of memory module $\mu$ instead of k from the memory module 0, we get $\alpha'(\mu)$ as follows:

$$\alpha'(\mu) = \alpha'(((\mu - \mu(0)) \cdot \lambda')\%m) \qquad (21)$$
$$= \alpha(((\mu - \mu(0)) \cdot \lambda')\%m) - \alpha(0),\ 0 \leq \mu < m$$

The $\alpha'(\mu), 0 \leq \mu<m$, are the pq address differences of the pq data elements and the m−pq dummy address differences which are arranged according to the index number of memory module $\mu$ from the memory module 0.

Because the $\alpha'(\mu), 0 \leq \mu<m$, are dependent up on $\mu(0)(=\mu(i, j))$, that is the index number of memory module for the data elements at the base coordinates, (i, j), the number of the address differences is increased according to the number of the memory modules, m. Therefore, it is very complex to use $\alpha'(\mu), 0 \leq \mu<m$, for the computation of the addresses of the data elements within the subarray (1)~(12), especially when the number of memory modules, m, is great. By substituting $(\mu+\mu(0))\%m$ instead of $\mu$ into (21), we get address differences of ascending order of the index numbers of memory modules from the memory module $\mu(0)$ as follows:

$$\alpha'(\mu+\mu(0))=\alpha'(\mu\cdot\lambda')\%m,\ 0 \leq \mu<m \qquad (22)$$

The address differences, $\alpha'(\mu\cdot\lambda')\%m, 0 \leq \mu<m$ of (22) is less dependent upon the location of the subarray because they do not contain the term $\mu(i, j)$ or $\alpha(i, j)$.

Therefore, it is possible to store these address differences in the memory modules for the address differences after computing the address differences in compile time. Only the one more operation to get $\alpha(\mu)$, is a right-rotation by $\mu(i, j)$ after the address differences $\alpha'(\mu+\mu(i, j))$ of (22) are added to $\alpha(i, j)$.

The address differences of the 12 subarray types (1)~(12) are represented as follows:

$$\begin{aligned}
AD\_SEB(i, j, r, a, b) &= \alpha(i+ar, j+br) - \alpha(i, j) \\
&= s \cdot ((i+ar)/p - (i/p)) + (j+br)/q - j/q \\
&= s \cdot ((i\%p + ar)/p) + (j\%q + br)/q, \\
&\quad 0 \leq a < p, 0 \leq b < q
\end{aligned} \qquad (23)$$

$$\begin{aligned}
AD\_SWB(i, j, r, a, b) &= \alpha(i+ar, j-br) - \alpha(i, j) \\
&= s \cdot ((i+ar)/p - (i/p)) + (j-br)/q - j/q \\
&= s \cdot ((i\%p + ar)/p) + (j\%q - br)/q, \\
&\quad 0 \leq a < p, 0 \leq b < q
\end{aligned} \qquad (24)$$

$$\begin{aligned}
AD\_NWB(i, j, r, a, b) &= \alpha(i-ar, j-br) - \alpha(i, j) \\
&= s \cdot ((i-ar)/p - (i/p)) + (j-br)/q - j/q \\
&= s \cdot ((i\%p - ar)/p) + (j\%q - br)/q, \\
&\quad 0 \leq a < p, 0 \leq b < q
\end{aligned} \qquad (25)$$

$$\begin{aligned}
AD\_NEB(i, j, r, a, b) &= \alpha(i-ar, j+br) - \alpha(i, j) \\
&= s \cdot ((i-ar)/p - (i/p)) + (j+br)/q - j/q \\
&= s \cdot ((i\%p - ar)/p) + (j\%q + br)/q, \\
&\quad 0 \leq a < p, 0 \leq b < q
\end{aligned} \qquad (26)$$

$$\begin{aligned}
AD\_EL(i, j, r, a) &= \alpha(i, j+ar) - \alpha(i, j) \\
&= (j\%q + ar)/q, \\
&\quad 0 \leq a < pq
\end{aligned} \qquad (27)$$

$$\begin{aligned}
AD\_SEL(i, j, r, a) &= \alpha(i+ar, j+ar) - \alpha(i, j) \\
&= s \cdot ((i\%p + ar)/p) + (j\%q + ar)/q, \\
&\quad 0 \leq a < pq
\end{aligned} \qquad (28)$$

$$\begin{aligned}
AD\_SL(i, j, r, a) &= \alpha(i+ar, j) - \alpha(i, j) \\
&= s((i\%p + ar)/p), \\
&\quad 0 \leq a < pq
\end{aligned} \qquad (29)$$

$$\begin{aligned}
AD\_SWL(i, j, r, a) &= \alpha(i+ar, j-ar) - \alpha(i, j) \\
&= s \cdot ((i\%p + ar)/p) + (j\%q - ar)/q, \\
&\quad 0 \leq a < pq
\end{aligned} \qquad (30)$$

-continued $$AD\_WL(i, j, r, a) = \alpha(i, j - ar) - \alpha(i, j) \qquad (31)$$
$$= (j\%q - ar)/q,$$
$$0 \le a < pq$$

$$AD\_NWL(i, j, r, a) = \alpha(i - ar, j - ar) - \alpha(i, j) \qquad (32)$$
$$= s((i\%p - ar)/p) + (j\%q - ar)/q,$$
$$0 \le a < pq$$

$$AD\_NL(i, j, r, a) = \alpha(i - ar, j) - \alpha(i, j) \qquad (33)$$
$$= s \cdot ((i\%p - a)/p)),$$
$$0 \le a < pq$$

$$AD\_NEL(i, j, r, a) = \alpha(i - ar, j + ar) - \alpha(i, j) \qquad (34)$$
$$= s \cdot ((i\%p - ar)/p) + (j\%q + ar)/q,$$
$$0 \le a < pq$$

The above address differences (23)–(34) are arranged in the modified row major order from the base coordinates (i,j) as follows:

$$AD\_SEB(i,j,r,k)=s\cdot((i\%p+(k/q\ r)/p)+(j\%q+(k\%q)r)/q,\ 0\le k<pq \quad (35)$$

$$AD\_SWB(i,j,r,k)=s\cdot((i\%p+(k/q\ r)/p)+(j\%q-(k\%q)r)/q,\ 0\le k<pq \quad (36)$$

$$AD\_NWB(i,j,r,k)=s\cdot((i\%p-(k/q)r)/p)+(j\%q-(k\%q)r)/q,\ 0\le k<pq \quad (37)$$

$$AD\_NEB(i,j,r,k)=s\cdot((i\%p-(k/q)r)/p)+(j\%q+(k\%q)r)/q,\ 0\le k<pq \quad (38)$$

$$AD\_EL(i,j,r,k)=(j\%q+kr)/q,\ 0\le k\le pq \quad (39)$$

$$AD\_SEL(i,j,r,k)=s\cdot((i\%p+kr)/p)+(j\%q+kr)/q,\ 0\le k<pq \quad (40)$$

$$AD\_SL(i,j,r,k)=s\cdot((i\%p+kr)/p)),\ 0\le k<pq \quad (41)$$

$$AD\_SWL(i,j,r,k)=s\cdot((i\%p+kr)/p)+(j\%q-kr)/q,\ 0\le k<pq \quad (42)$$

$$AD\_WL(i,j,r,k)=(j\%q-kr)/q,\ 0\le k<pq \quad (43)$$

$$AD\_NWL(i,j,r,k)=s\cdot((i\%p-kr)/p)+(j\%q-kr)/q,\ 0\le k<pq \quad (44)$$

$$AD\_NL(i,j,r,k)=s\cdot((i\%p-kr)/p)),\ 0\le k<pq \quad (45)$$

$$AD\_NEL(i,j,r,k)=s\cdot((i\%p-kr)/p)+(j\%q+kr)/q,\ 0\le k<pq \quad (46)$$

Because the address differences which depend upon j%q have the binary term, separating the address differences of (35)–(46) of SEB, SWB, NWB, NEB, EL, SEL, SWL, WL, NWL and NEL into the binary values, which are stored in memory module B for input C of the adder array, and the remaining values, which are stored in memory module A for input B results in size reduction of address differences.

The address differences of the South-East Block (SEB) are separated as follows:

$$AD\_SEB(i,j,r,k)=s\cdot((i\%p+(k/q)r)/p)+((k\%q)r)/q,\ 0\le k<pq(\text{for memory module A})+(j\%q+(k\%q)r)/q-((k\%q)r)/q,0\le k<pq(\text{for memory module B}) \quad (47)$$

The address differences of the other 11 subarray types are represented as follows:

$$AD\_SWB(i,j,r,k)=s\cdot((i\%p+(k/q)r)/p)-((k-(k/q)q)r)/q,\ (\text{for memory module A})+(j\%q-(k\%q)r)/q+((k\%q)r)/q(\text{for memory module B}),0\le k<pq \quad (48)$$

$$AD\_NWB(i,j,r,k)=s\cdot((i\%p-(k/q)r)/p)-((k-(k/q)q)r)/q,\ (\text{for memory module A})+(j\%q-(k\%q)r)/q+((k\%q)r)/q,\ (\text{for memory module B}),0\le k<pq \quad (49)$$

$$AD\_NEB(i,j,r,k)=s\cdot((i\%p-(k/q)r)/p)+((k-(k/q)q)r)/q,\ (\text{for memory module A})+(j\%q+(k\%q)r)/q-((k\%q)r)/q(\text{for memory module B}),0\le k<pq \quad (50)$$

$$AD\_EL(i,j,r,k)=(kr)/q,\ (\text{for memory module A})+(j\%q+(k\%q)r)/q-((k\%q)r)/q(\text{for memory module B}),0\le k<pq \quad (51)$$

$$AD\_SEL(i,j,r,k)=s\cdot((i\%p+kr)/p)+(kr)/q,\ (\text{for memory module A})+(j\%q+kr)/q-(kr)/q(\text{for memory module B}),0\le k<pq \quad (52)$$

$$AD\_SL(i,j,r,k)=s\cdot((i\%p+kr)/p))\ (\text{for memory module A}),\ 0\le k<pq \quad (53)$$

$$AD\_SWL(i,j,r,k)=s\cdot((i\%p+kr)/p)-(kr)/q,\ (\text{for memory module A})+(j\%q-(k\%q)r)/q+((k\%q)r)/q(\text{for memory module B}),0\le k<pq \quad (54)$$

$$AD\_WL(i,j,r,k)=-(kr)/q(\text{for memory module A})+(j\%qkr)/q+(kr)/q(\text{for memory module B}),0\le k<pq \quad (55)$$

$$AD\_NWL(i,j,r,k)=s\cdot((i\%p-kr)/p)-(kr)/q,\ (\text{for memory module A})+(j\%q-(k\%q)r)/q+((k\%q)r)/q(\text{for memory module B}),0\le k<pq \quad (56)$$

$$AD\_NL(i,j,r,k)=s\cdot((i\%p-kr)/p))\ (\text{for memory module A}),\ 0\le k<pq \quad (57)$$

$$AD\_NEL(i,j,r,k)=s\cdot((i\%p-kr)/p)+(kr)/q,\ (\text{for memory module A})+(j\%q+(k\%q)r)/q-((k\%q)r)/q,\ (\text{for memory module B}),0\le k<pq \quad (58)$$

The above 12 address differences are summarized in Table 2.

TABLE 2

| | Memory module A for the address differences | Memory module B for the address differences |
|---|---|---|
| SEB | ((i%p + (k/q)r)/p) + ((k%q)r)/q | (j%q + (k%q)r)/q − ((k%q)r)/q |
| SWB | ((i%p + (k/q)r)/p) − ((k−(k/q)q)r)/q | (j%q − (k%q)r)/q + ((k%q)r)/q |
| NWB | ((i%p − (k/q)r)/p) − ((k−(k/q)q)r)/q | (j%q − (k%q)r)/q + ((k%q)r)/q |
| NEB | ((i%p − (k/q)r)/p) + ((k−(k/q)q)r)/q | (j%q + (k%q)r)/q − ((k%q)r)/q |
| EL | (kr)/q | (j%q + (k%q)r)/q − ((k%q)r)/q |
| SEL | ((i%p + kr)/p) + (kr)/q | ((j%q + kr)/q − (kr)/q |
| SL | ((i%p + kr)/p)) | |
| SWL | ((i%p + kr)/p) − (kr)/q | (j%q − (k%q)r)/q + ((k%q)r)/q |
| WL | (j%q − kr)/q) − (kr)/q | (j%q − kr)/q + (kr)/q |
| NWL | ((i%p − kr)/p) − (kr)/q | j%q − (k%q)r)/q + ((k%q)r)/q |
| NL | ((i%p − kr)/p)) | |
| NEL | ((i%p − kr)/p) + (kr)/q | j%q + (k%q)r)/q − ((k%q)r)/q |

The address calculation circuitry computes pq addresses by adding the base address and the address differences of the block of (47), the row of (51), and the column subarray of (53), J. W. Park, *IEEE Trans. Comput.*, vol. C-35, pp.669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996. Therefore, the address routing method becomes more complex to be implemented for the address differences (47)–(58) of the 12 subarray types and constant intervals (1)–(12) because the addresses of the 12 subarray types (1)–(12) are varied by the positive constant interval r as well as by the threshold value, p−i%p or q−j%q. If the address differences (47)–(58) are prearranged into the ascending order according to the index numbers of memory modules from the index number of the memory module of the first element of the required subarray, and stored into memory modules A and B, the address calculation and routing circuitry can compute m addresses simply by adding the base address, a(i,j), to the address differences and by rotating the m addresses right by the same number of the memory module of the first element for all 12 subarray types and constant intervals (1)–(12).

From Theorem 1, the index numbers of the accessed pq memory modules are represented as follows for the 12 subarray types (1)–(12) and constant intervals for r%m≠0:

$$IN\_SEB(i,j,r)=\mu(i+ar,j+br)=(\mu(i,j)+qar+br)\%m,\ 0\leq a<p,\ 0\leq b<q \quad (59)$$

$$IN\_SWB(i,j,r)=\mu(i+ar,j-br)=(\mu(i,j)+qar-br)\%m,\ 0\leq a<p,\ 0\leq b<q \quad (60)$$

$$IN\_NWB(i,j,r)=\mu(i-ar,j-br)=(\mu(i,j)-qar-br)\%m,\ 0\leq a<p,\ 0\leq b<q \quad (61)$$

$$IN\_NEB(i,j,r)=\mu(i+ar,j+br)=(\mu(i,j)-qar+br)\%m,\ 0\leq a<p,\ 0\leq b<q \quad (62)$$

$$IN\_EL(i,j,r)=\mu(i,j+br)=(\mu(i,j)+br)\%m,\ 0\leq b<pq \quad (63)$$

$$IN\_SEL(i,j,r)=\mu(i+ar,j+ar)=(\mu(i,j)+(q+1)ar)\%m,\ 0\leq a<pq \quad (64)$$

$$IN\_SL(i,j,r)=\mu(i+ar,j)=(\mu(i,j)+qar)\%m,\ 0\leq a<pq \quad (65)$$

$$IN\_SWL(i,j,r)=\mu(i+ar,j-ar)=(\mu(i,j)+(q-1)ar)\%m,\ 0\leq a<pq \quad (66)$$

$$IN\_WL(i,j,r)=\mu(i,j-ar)=(\mu(i,j)-br)\%m,\ 0\leq a<pq \quad (67)$$

$$IN\_NWL(i,j,r)=\mu(i-ar,j-ar)=(\mu(i,j)-(q+1)ar)\%m,\ 0\leq a<pq \quad (68)$$

$$IN\_NL(i,j,r)=\mu(i-ar,j)=(\mu(i,j)-qar)\%m,\ 0\leq a<pq \quad (69)$$

$$IN\_NEL(i,j,r)=\mu(i-ar,j+ar)=(\mu(i,j)-(q-1)ar)\%m,\ 0\leq a<pq \quad (70)$$

The above index numbers (59)–(70) are arranged in the modified row major order from base coordinates (i,j) as follows:

$$\mu SEB(k) = (\mu(0) + q \cdot (k/q)r + (k\%q)\cdot r)\%m$$
$$= (\mu(0) + kr)\%m,$$
$$0 \leq k < pq \quad (71)$$

$$\mu SWB(k) = (\mu(0) + q \cdot (k/q)\cdot r - (k\%q)\cdot r)\%m$$
$$= (\mu(0) + (q\cdot(k/q) - (k\%q))\cdot r)\%m,$$
$$0 \leq k < pq \quad (72)$$

$$\mu NWB(k) = (\mu(0) - q \cdot (k/q)\cdot r - (k\%q)\cdot r)\%m$$
$$= (\mu(0) - kr)\%m,$$
$$0 \leq k < pq \quad (73)$$

$$\mu NEB(k) = (\mu(0) - q \cdot (k/q)\cdot r + (k\%q)\cdot r)\%m$$
$$= (\mu(0) - (q(k/q) - (k\%q))r)\%m,$$
$$0 \leq k < pq \quad (74)$$

$$\mu EL(k)=(\mu(0)+kr)\%m,\ 0\leq k<pq \quad (75)$$

$$\mu SEL(k)=(\mu(0)+(q+1)kr)\%m,\ 0\leq k<pq \quad (76)$$

$$\mu SL(k)=(\mu(0)+qkr)\%m,\ 0\leq k<pq \quad (77)$$

$$\mu SWL(k)=(\mu(0)+(q-1)kr)\%m,\ 0\leq k<pq \quad (78)$$

$$\mu WL(k)=(\mu(0)-kr)\%m,\ 0\leq k<pq \quad (79)$$

$$\mu NWL(k)=(\mu(0)-(q+1)kr)\%m,\ 0\leq k<pq \quad (80)$$

$$\mu NL(k)=(\mu(0)-qkr)\%m,\ 0\leq k<pq \quad (81)$$

$$\mu NEL(k)=(\mu(0)-(q-1)kr)\%m,\ 0\leq k<pq \quad (82)$$

Here, $\mu(0)$ is $\mu(i,j)$.

Address Differences of South-East Block (SEB)

The address difference of the South-East Block (SEB) of the $\mu$th module, $ASEB(\mu)$ is obtained from (47) and (71) by using procedure (17)–(22):

$$ASEB(\mu)=s\cdot((i\%p+((((\mu-\mu(0))r')\%m)/q)r)/p)+(((((\mu-\mu(0))r')\%m)\%q)r)/q,\ 0\leq\mu<m\ \text{(for memory module A)}$$

$$+(j\%q+((((\mu-\mu(0))r')\%m)\%q)r)/q-((((( \mu-\mu(0))r')\%m)\%q)r)/q,\ 0\leq\mu<m\ \text{(for memory module B)} \quad (83)$$

Here, the equation of r·r'=1%m is applied.

By substituting $(\mu+\mu(0))\%m$ instead of $\mu$ into (83) we get address differences of ascending order of memory modules from $\mu(0)$ as follows:

$$ASEB(\mu+\mu(0))=s\cdot((i\%p+(((\mu r')\%m)/q)r)/p)+((((\mu r')\%m)\%q)r)/q,\ 0\leq\mu<m\ \text{(for memory module A)}$$

$$+(j\%q+(((\mu r')\%m)\%q)r)/q-((((\mu r')\%m)\%q)r)/q,0\leq\mu<m\ \text{(for memory module B)} \quad (84)$$

Here, the equation of r·r'=1%m is applied.

Address Differences of South-West-Block (SWB)

Because the index numbers (72) of SWB(i, j, r) are not in the form of (19), the index numbers and the address differences of SEB(i, j−(q−1)r, r) are considered instead of the SWB(i, j, r). The address differences of SEB(i, j−(q−1)r, r) are as follows:

$$AD\_SEB(i,(j-(q-1)r),r,k)=s\cdot((i\%p+(k/q)r)/p)+((k\%q)r)/q,\ 0\leq k<pq\ \text{(for memory module A)}$$

$$+(j\%q-(q-1)r+(k\%q)r)/q-((k\%q)r)/q,0\leq k<pq\ \text{(for memory module B)} \quad (85)$$

The index numbers of the memory modules of SEB(i, j−(q−1)r,k) are as follows:

$$(\mu(0)-(q-1)r+kr)\%/m,\ 0\leq k<pq \quad (86)$$

Therefore, the address difference of South-West Block (SWB) of the $\mu$th module, $ASWB(\mu)$ can be obtained from (85) and (86):

$$ASWB(\mu)=s\cdot((i\%p+((((\mu-\mu(0)+(q-1)r)r')\%m)/q)r)/p)+((((( \mu-\mu(0)+(q-1)r)r')\%m)\%q)r)/q,\ 0\leq\mu<m\ \text{(for memory module A)}$$

$$+(j\%q-(q-1)r+((((\mu-\mu(0)+(q-1)r)r')\%m)\%q)r)/q-(((((\mu-\mu(0)+(q-1)r)r')\%m)\%q)r)/q,\ 0<m\ \text{(for memory module B)} \quad (87)$$

Here, the equation of r·r'=1%m is applicable.

By substituting $(\mu+\mu(0)+(q-1)r)\%m$ instead of $\mu$ into (87) we get address differences of ascending order of memory modules from $\mu(0)$ as follows:

$$ASWB(\mu+\mu(0))=s\cdot((i\%p+((((\mu+(q-1)r)r')\%m)/q)r)/p)+(-(q-1)r+((((\mu+(q-1)r)r')\%m)\%q)r)/q,\ 0\leq\mu<m\ \text{(for memory module A)}$$

$$+(j\%q-(q-1)r+((((\mu+(q-1)r)r')\%m)\%q)r)/q-(-(q-1)r+((((\mu+(q-1)r)r')\%m)\%q)r)/q,0\leq\mu<m\ \text{(for memory module B)}, \quad (88)$$

Here, the equation of r·r'=1%m is applicable.

The address differences of the other 10 subarray types of ascending order of memory modules from $\mu(0)$ are obtained by using the same procedure as the SEB or the SWB. The address differences of 12 subarray types and constant intervals (1)–(12) of ascending order of memory modules from $\mu(0)$ are represented in Table 3.

TABLE 3

| Subarray type | Memory module A for the address differences | Memory module B for the address differences |
| --- | --- | --- |
| SEB | $s \cdot ((i\%p+((( \mu r')\%m)/q)r)/p)+ ((((\mu r')\%m)\%q)r)/q$<br>$r \cdot r' = 1\%m$ | $(j\%q+((( \mu r')\%m)\%q)r)/q - ((((\mu r')\%m)\%q)r)/q$ |
| SWB | $s \cdot ((i\%p+(((\mu+(q-1))r')\%m)/q)r)/p)+ (-(q-1)r+((( \mu+(q-1)r)r')\%m)\%q)r)/q$<br>$r \cdot r' = 1\%m$ | $(j\%q-(q-1)r+(((\mu+(q-1)r)r')\%m)\%q)r)/q-(-(q-1)r+ ((((\mu+(q-1)r)r')\%m)\%q)r)/q$ |
| NWB | $s \cdot ((i\%p+((( \mu(-r)')\%m)/q)r)/p)- ((((\mu(-r)')\%m)\%q)r)/q$<br>$(-r) \cdot (-r)' = 1\%m$ | $(j\%q-(((\mu(-r)')\%m\%q)r)/q+ ((((\mu(-r)')\%m\%q)r)/q$ |
| NEB | $s \cdot ((i\%p-(p-1)r+(((\mu+(p-1)qr)r')\%m)/q)r)/p)+((((( \mu+(p-1)qr)r')\%m)\%q)r)/q$<br>$r \cdot r' = 1\%m$ | $(j\%q+((((\mu+(p-1)qr)r')\%m)\%q)r)/q- (((((\mu+(p-1)qr)r')\%m)\%q)r)/q$ |
| EL | $(((\mu r')\%m)r)/q$<br>$r \cdot r' = 1\%m$ | $(j\%q+((( \mu r')\%m)\%q)r)/q- ((((\mu r')\%m)\%q)r)/q$ |
| SEL | $s \cdot ((i\%p+((\mu+((q+1)r)')\%m)r)/p)+((\mu((q+1)r)')\%m)r)/q$<br>$((q+1)r) \cdot ((q+1)r)' = 1\%m$ | $(j\%q+(((\mu((q+1)r)')\%m)\%q)r)/q- ((((\mu((q+1)r)')\%m)\%q)r)/q$ |
| SL | $s \cdot ((i\%p+((\mu(qr)')\%m)r)/p)$<br>$(qr) \cdot (qr)' = 1\%m$ | |
| SWL | $s \cdot ((i\%p+((\mu+((q-1)r)'\%m)r)/p)- (((\mu((q-1)r)')\%m)r)/q$<br>$((q-1)r) \cdot ((q-1)r)' = 1\%m$ | $(j\%q- (((\mu((q-1)r)')\%m)\%q)r)/q+ ((((\mu((q-1)r)')\%m)\%q)r)/q$ |
| WL | $-(((\mu(-r)')\%m)r)/q$<br>$(-r) \cdot (-r)' = 1\%m$ | $(j\%q- (((\mu(-r)')\%m)\%q)r)/q+ ((((\mu(-r)')\%m)\%q)r)/q$ |
| NWL | $s \cdot ((i\%p-((\mu(-(q+1)r)')\%m)r)/p) - (((\mu(-(q+1)r)')\%m)r)/q$<br>$(-(q+1)r) \cdot (-(q+1)r)' = 1\%m$ | $(j\%q-(((\mu(-(q+1)r)')\%m)\%q)r)/q+ ((((\mu(-(q+1)r)')\%m)\%q)r)/q$ |
| NL | $s \cdot ((i\%p-((\mu(-qr)')\%m)r)/p))$<br>$(-qr) \cdot (-qr)' = 1\%m$ | |
| NEL | $s \cdot ((i\%p-((\mu(-(q-1)r)')\%m)r)/p)+(((\mu(-(q-1)r)')\%m)r)/q$<br>$(-(q-1)r) \cdot (-(q-1)r)' = 1\%m$ | $(j\%q+(((\mu(-(q-1)r)')\%m)\%q)r)/q- ((((\mu(-(q-1)r)')\%m)\%q)r)/q$ |

Size of Address Differences

The address differences of Table 3 of SEB, SWB, NWB, NEB, SEL, SWL, NWL, and NEL depend upon, $\mu$, r, i%p, and j%q, so the size of the address differences of SEB, SWB, NWB, NEB, SEL, SWL, NWL, and NEL is 8×p×m×#r× $\log_2(MN/pq)$ bits for memory module A and 8×q×m×#r bits for memory module B, where #r represents the number of constant intervals. The address differences of EL and WL depend upon k, r and j%p, so the size of the address differences of EL and WL 2×q×m×#r×$\log_2(MN/pq)$ bits for memory module A and 2×q×m×#r bits for memory module B. The address differences of SL and NL depend upon k, r, and i%p, so the size of the address differences of SL and NL is 2×q×m×#r×$\log_2(MN/(pq))$ bits for memory module A. There are no address differences of SL and NL for memory module B because those address differences do not depend on j%q. Therefore, the total size of the address differences for the memory system of the present invention is (12×p× m×$\log_2(MN/pq)$+10×q×m)×#r bits. A drawback of the method of the present invention and its memory system is that the size of memory modules A and B becomes too great to store the address differences of Table 3 of all the 12 subarray types and constant intervals (1)–(12). Therefore, only the address differences of the required subarray types and constant intervals should be computed and stored into memory modules A and B in compile time.

The address calculation and routing circuitry of the present invention performs the following operations sequentially:

(1) The prearranged p×m address differences and q×m address differences are stored in memory modules A and B, respectively for each subarray type and each constant interval;

(2) The m address differences are retrieved from memory modules A and B with the required subarray type, i%p, j%q, and the constant interval because the address differences depend on the subarray type, i%p, j%q, and the constant interval as well as $\mu(0 \leq \mu < m)$;

(3) Those m address differences are added to the base address, $\alpha(i,j)$;

(4) Those m addresses are rotated by $\mu(0)$ for all the 12 subarray types and constant intervals (1)–(12); and (5) Those m addresses are routed to m memory modules.

The role of the data routing circuitry from the data register to the m memory modules is to route pq data elements to the appropriate memory modules. The index numbers of the memory modules for the pq data elements are the same as those of addresses (71)–(82). Therefore, a right-rotation is performed by $\mu(i,j)$ times in order for the index numbers of the memory modules of those data elements to be in the ascending order from index 0 after arranging the pq data elements as follows:

$$SEB:D2((kr)\%m).D1(k), 0 \leq k < pq \qquad (89)$$

$$SWB:D2(((q \cdot (k/q)-k\%q) \cdot r)\%m).D1(k), 0 \leq k < pq \qquad (90)$$

$$NWB:D2((-kr)\%m).D1(k), 0 \leq k < pq \qquad (91)$$

$$NEB:D2(((-q \cdot (k/q)+k\%q) \cdot r)\%m).D1(k), 0 \leq k < pq \qquad (92)$$

$$EL:D2((kr)\%m).D1(k), 0 \leq k < pq \qquad (93)$$

$$SEL:D2(((q+1)kr)\%m).D1(k), 0 \leq k < pq \qquad (94)$$

$$SL:D2((qkr)\%m).D1(k), 0 \leq k < pq \qquad (95)$$

$$SWL:D2(((q-1)kr)\%m).D1(k), 0 \leq k < pq \quad (96)$$

$$WL:D2((-kr)\%m).D1(k), 0 \leq k < pq \quad (97)$$

$$NWL:D2((-(q+1)kr)\%m).D1(k), 0 \leq k < pq \quad (98)$$

$$NL:D2((-qkr)\%m).D1(k), 0 \leq k < pq \quad (99)$$

$$NEL:D2((-(q-1)kr)\%m).D1(k), 0 \leq k < pq \quad (100)$$

Here, D1 and D2 registers are the data register and a temporary register, respectively. The control of the data routing circuitry by using the routing patterns (89)~(100) is complex because the routing patterns depend on the subarray type and the constant interval. Those data routing patterns can be reduced as follows:

SEB

The index numbers of the memory modules of the constant interval r of the data routing pattern of the SEB of (89), (kr)%m, are (k·m·11+k·r1)%m, where r1=r%m, and, 11=a positive integer. Therefore, the routing pattern of the constant interval r of the SEB of (89) is selected from the following (m−1) different routing patterns with r1(=r%m):

$$SEB:D2((kr1)\%m).D1(k), 0 \leq k < pq \quad (101)$$

SWB

The index numbers of the memory modules of the constant interval r of the data routing pattern of the SWB of (90), ((q·(k/q)−k%q)·r)%m, are (k·m·12+(q·(k/q)−k%q)·r1)%m, where r1=r%m and 12=a positive integer. Therefore, the routing pattern of the constant interval r of the SEB of (90) is selected from the following (m−1) different routing patterns with r1=r%m:

$$SWB:D2(((q·(k/q)-k\%q)·r1)\%m).D1(k), 0 \leq k < pq \quad (102)$$

The index numbers of the constant interval r of the data routing pattern of the NWB of (91), (−kr)%m, are the same as the index numbers of the constant interval (−r)%m of the data routing pattern of the SEB of (89), (kr)%m. Therefore, (m−1) different routing patterns of the SEB of (101) can be used fro the NWB by selecting with the constant interval (−r)%m instead of the constant interval r.

NEB

The index numbers of the constant interval r of the data routing pattern of the NEB of (92), ((−q(k/q)+k%q)r)%m, are the same as ((q(k/q)−k%q)·(−r))%m, which are the index numbers of the constant interval (−r)%m of the data routing pattern of the SWB of (90), ((q·(k/q)−k%q)·r)%m. Therefore, (m−1) different routing patterns of the SWB of (102) can be used fro the NEB by selecting with the constant interval (−r)%m instead of the constant interval r.

EL

The index numbers of the constant interval r of the data routing pattern of the EL of (93), (kr)%m, are the same as the index numbers of the constant interval r of the data routing pattern of the SEB of (89). Therefore, (m−1) different routing patterns of the SEB of (101) can be used for the EL by selecting with the constant interval r%m instead of the constant interval r.

SEL

The index numbers of the constant interval r of the data routing pattern of the SEL of (94), ((q+1)kr)%m, are the same as the index numbers of the constant interval ((q+1)r)%m of the data routing pattern of the SEB of (89), (kr)%m. Therefore, (m−1) different routing patterns of the SEB of (101) can be used for the SEL by selecting with the constant interval ((q+1)r)%m instead of the constant interval r.

SL

The index numbers of the constant interval r of the data routing pattern of the SL of (95), (qkr)%m, are the same as the index numbers of the constant interval (qk)%m of the data routing pattern of the SEB of (89), (kr)%m. Therefore, (m−1) different routing patterns of the SEB of (101) can be used for the SL by selecting with the constant interval (qr)%m instead of the constant interval r.

SWL

The index numbers of the constant interval r of the data routing pattern of the SWL of (96), ((q−1)kr)%m, are the same as the index numbers of the constant interval ((q−1)r)%m of the data routing pattern of the SEB of (89), (kr)%m. Therefore, (m−1) different routing patterns of the SEB of (101) can be used for the EL by selecting with the constant interval ((q−1)r)%m instead of the constant interval r.

WL

The index numbers of the constant interval r of the data routing pattern of the WL of (97), (−kr)%m, are the same as (k(−r))%m), which are the index numbers of the constant interval (−r)%m of the data routing pattern of the SEB of (89), (kr)%m. Therefore, (m−1) different routing patterns of the SEB of (101) can be used for the WL by selecting with the constant interval (−r)%m instead of the constant interval r.

NWL

The index numbers of the constant interval r of the data routing pattern of the NWL of (98), (−(q+1)r)%m, are the same as (k(−(q+1)r))%m, which are the index numbers of the constant interval (−(q+1)r)%m of the data routing pattern of the SEB of (89), (kr)%m. Therefore, (m−1) different routing patterns of the SEB of (101) can be used for the NWL by selecting with the constant interval (−(q+1)r)%m instead of the constant interval r.

NL

The index numbers of the constant interval r of the data routing pattern of the NL of (99), (−qkr)%m, are the same as (−k(qr))%m, which are the index numbers of the constant interval (−qr)%m of the data routing pattern of the SEB of (89), (kr)%m. Therefore, (m−1) different routing patterns of the SEB of (101) can be used for the NL by selecting with the constant interval (−qr)%m instead of the constant interval r.

NEL

The index numbers of the constant interval r of the data routing pattern of the NEL of (100), (−(q−1)kr)%m, are the same as (k(−(q−1)r))%m (kr)%m, which are the index numbers of the constant interval (−(q−1)r)%m of the data routing pattern of the SEB of (89), (kr)%m. Therefore, (m−1) different routing patterns of the SEB of (101) can be used for the NEL by selecting with the constant interval (−(q−1)r)%m instead of the constant interval r.

The reduced routing patterns are represented in Table 4.

TABLE 4

| Subarray types with the constant interval r | Reduced subarray type with the constant interval (r1 = r%m) |
| --- | --- |
| SEB with r | SEB with r1 |
| SWB with r | SWB with r1 |
| NWB with r | SEB with (−r1)%m |
| NEB with r | SWB with (−r1)%m |
| EL with r | SEB with r1 |
| SEL with r | SEB with ((q+1)r1)%m |
| SL with r | SEB with (qr1)%m |
| SWL with r | SEB with ((q−1)r1)%m |
| WL with r | SEB with (−r1)%m |
| NWL with r | SEB with (−(q+1)r1)%m |
| NL with r | SEB with (−qr1)%m |
| NEL with r | SEB with (−(q−1)r1)%m |

The total number of routing patterns for the 12 subarray type results in 2(m−1). Therefore, the data routing circuitry required for only the two routing patterns of SEB of (101) and SWB of (102) can be used for the 12 subarray types and the constant intervals (1)–(12).

Figure 5A:
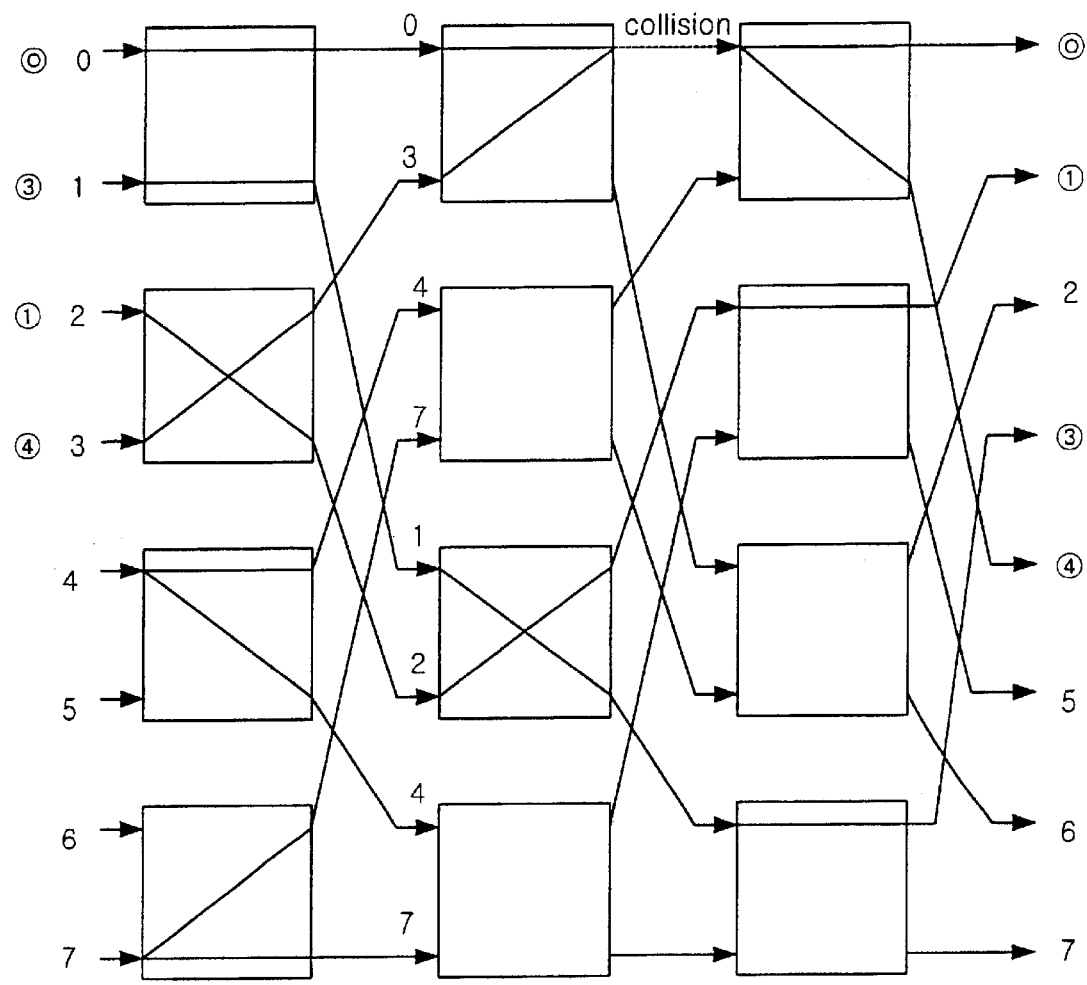
FIG. 5(a) is drawing, which shows an example of collision paths of switching elements of 8×8 inverse Omega network.
Figure 5B:
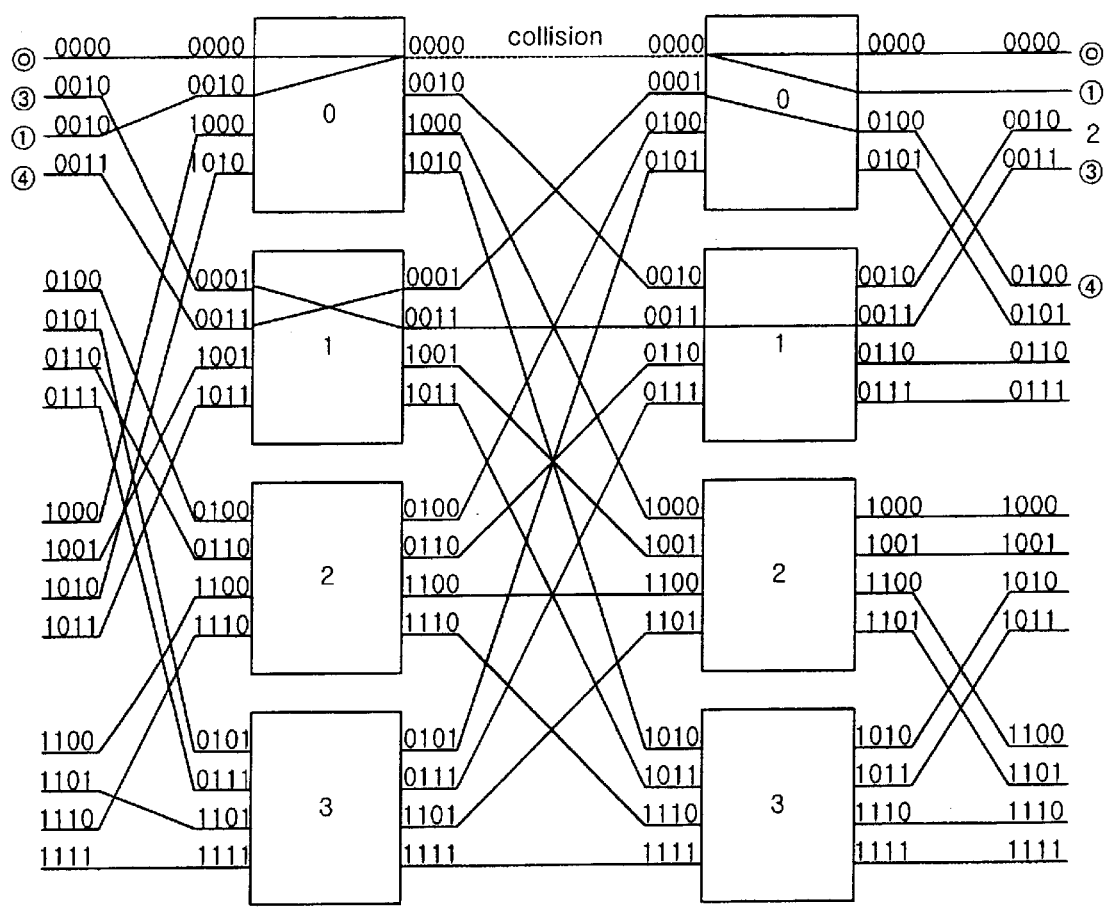
FIG. 5(b) is drawing, which shows an example of collision paths of switching elements of N=16 Theta network.

The data routing circuitry of the present invention is represented in FIGS. 5(a) and 5(b), where the 12 subarray types and the constant interval are converted into 2(m−1) routing patterns by using a ROM and $\log_2(2(m-1)) \times 2(m-1)$ decoder, and a selector using tri-state buffers. There, the routing patterns for the 12 subarray types and the constant interval r can not be implemented in the Omega network, or the Theta network because of the collision of the paths, J. Frailong, W. Jalby, and J. Lenfant, *Proc. Int. Conf. Parallel Processing*, pp. 276–283, 1985; C. S. Raghavendra and R. Boppana, *Proc. Int. Conf. Parallel Processing*, pp.76–83, 1990; D. H. Lawrie, *IEEE Trans. Comput.*, vol. C-24, No. 12, pp. 1145–1155, December 1975; D. Lee, "Scrambled Storage for Parallel Memory Systems," *Proc. Int. Symp. on Comp. Architecture*, pp. 232–239, 1988. The data routing circuitry of the present invention is simple compared to the crossbar network, D. T. Harper III, *IEEE Trans. Comput.*, vol. C-43, pp.618–622, May 1994; H. Shapiro, *IEEE Trans. Comput.*, vol. C-27, no. 5, pp. 421–428, May 1978; D. H. Lawrie and C. R. Vora, *IEEE Trans. Comput.*, vol. C-31, pp.435–442, May 1982. For the READ operations, the routing patterns are reversed.

The memory module selection for a row, a block, a column, whose constant interval is one has been considered by D. C. Van Voorhis and T. H. Morrin, *IEEE Trans. Comput.*, vol. C-27, pp.113–125, February 1978; J. W. Park, *IEEE Trans. Comput.*, vol. C-35, pp.669–674, July 1986. The memory module selection circuitry enables pq memory modules whose index numbers are represented in (71)–(82). In general, since m−pq<<pq, it is easier to implement the memory module selection circuitry to identify the unused memory modules.

The following Theorem 2 shows m−pq unaccessed index number of memory modules for the 12 subarray types (1)–(12).

Theorem 2: The index numbers of the m−pq unaccessed memory modules for the 12 subarray types are:

$SEB(k)=(\mu(0)+kr)\%m, pq \leq k<m$ (103)

$SWB(k)=(\mu(0)+(q\cdot(k/q)-(k\%q))\cdot r)\%m, pq \leq k<m$ (104)

$NWB(k)=(\mu(0)-kr)\%m, pq \leq k<m$ (105)

$NEB(k)=(\mu(0)-(q\cdot(k/q)-(k\%q))\cdot r)\%m, pq \leq k<m$ (106)

$EL(k)=(\mu(0)+kr)\%m, pq \leq k<m$ (107)

$SEL(k)=(\mu(0)+(q+1)kr)\%m, pq \leq k<m$ (108)

$SL(k)=(\mu(0)+qkr)\%m, pq \leq k<m$ (109)

$SWL(k)=(\mu(0)+(q-1)kr)\%m, pq \leq k<m$ (110)

$WL(k)=(\mu(0)-kr)\%m, pq \leq k<m$ (111)

$NWL(k)=(\mu(0)-(q+1)kr)\%m, pq \leq k<m$ (112)

$NL(k)=(\mu(0)-qkr)\%m, pq \leq k<m$ (113)

$NEL(k)=(\mu(0)-(q-1)kr)\%m, pq \leq k<m$ (114)

Here, $\mu(0)$ is $\mu(i, j)$.

If the above m−pq index numbers (103)–(104) are supplied to the m−pq decoders, the m outputs of the ORing of the corresponding inverted outputs of the decoders control the accesses to the m memory modules.

In particular, for m=pq+1, the index number of the single unaccessed module which is obtained by substituting pq instead of k into (103)–(104) is supplied to a decoder, and the m inverted outputs of the decoder are used as pq enabling signals to the pq accessed memory modules and one disabling signal to the one unaccessed memory module.

Examples of Address Calculation and Routing, and Memory Module Selection

Figure 6:
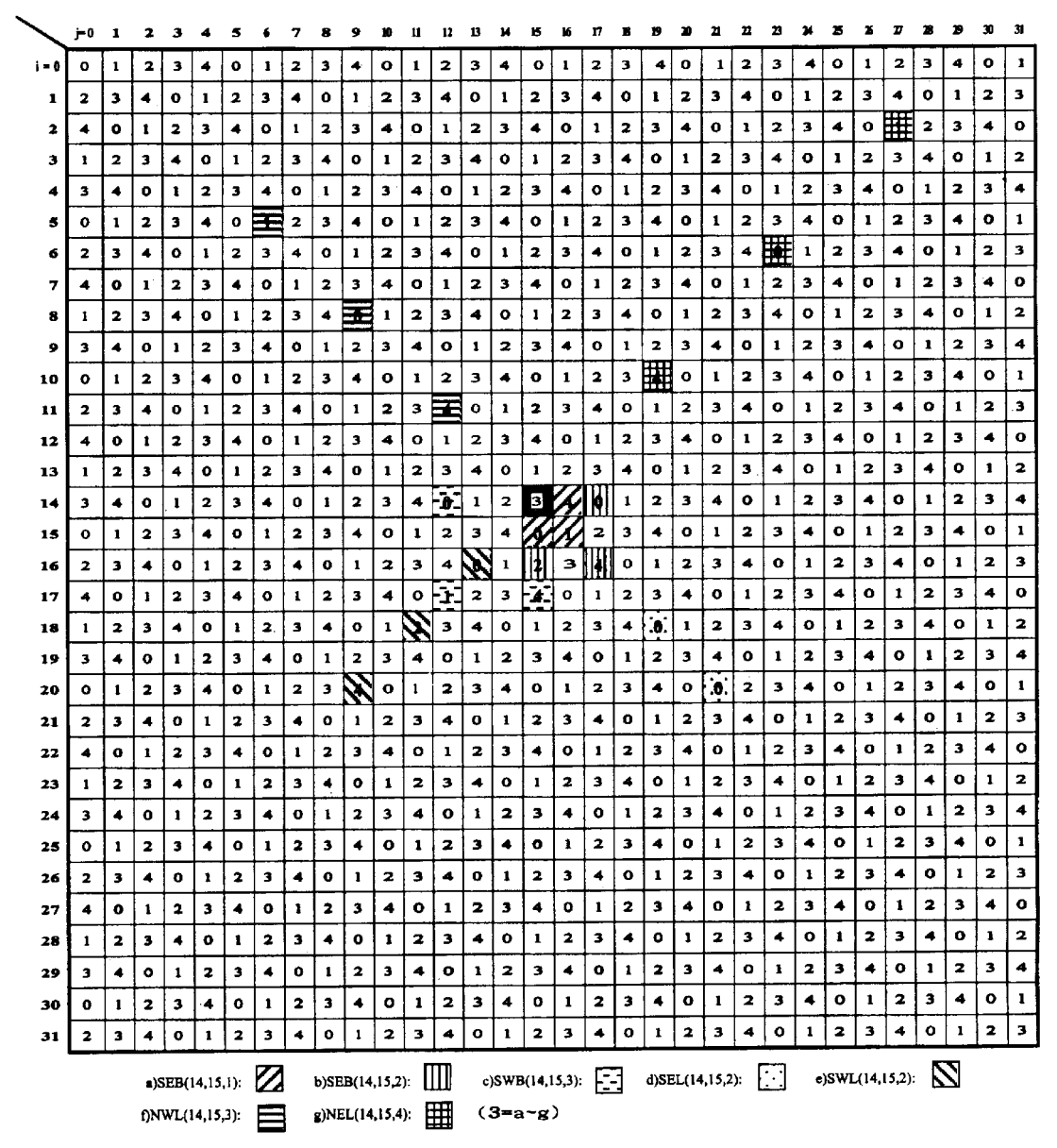
Figure 7:
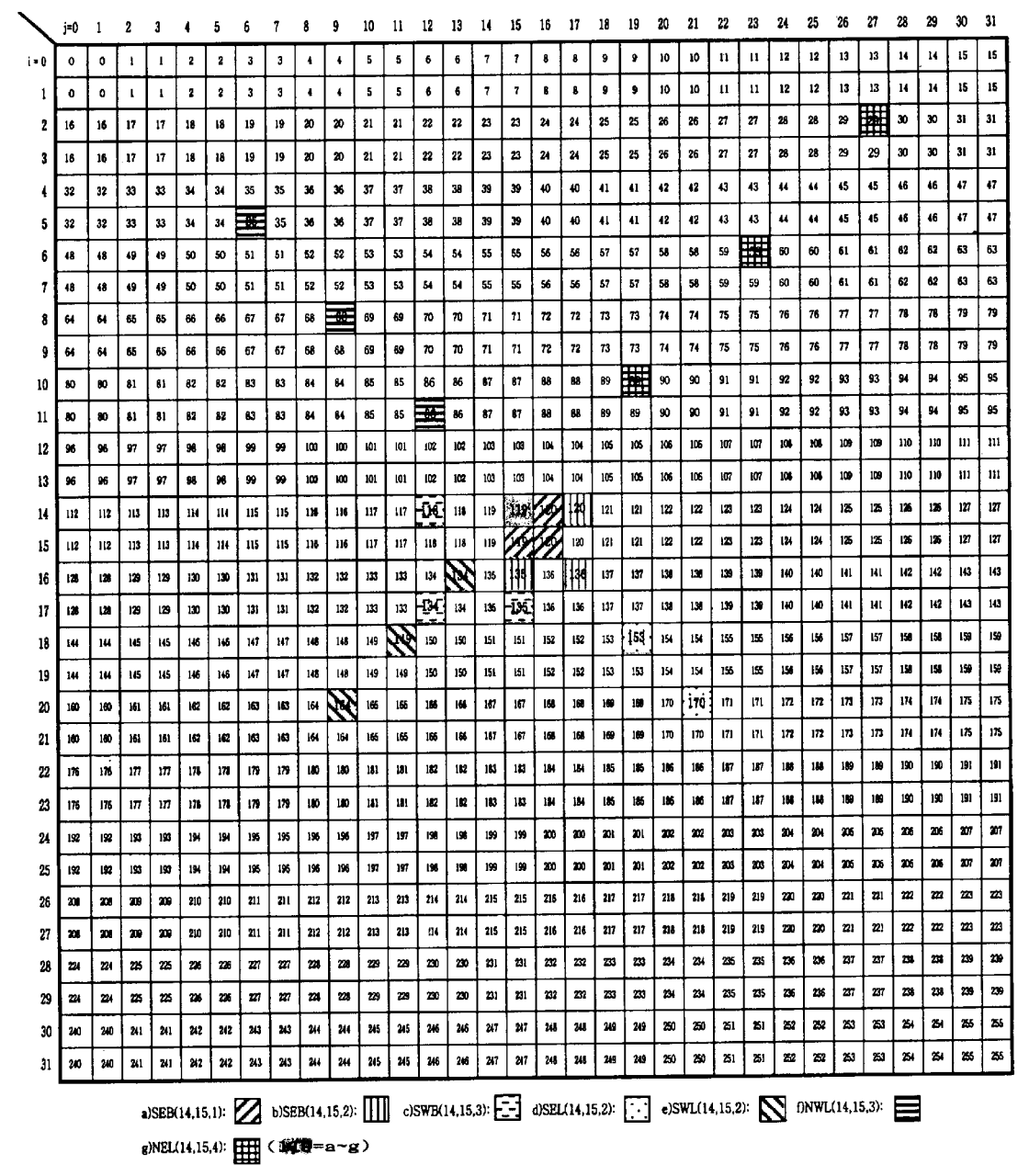
Figure 8:
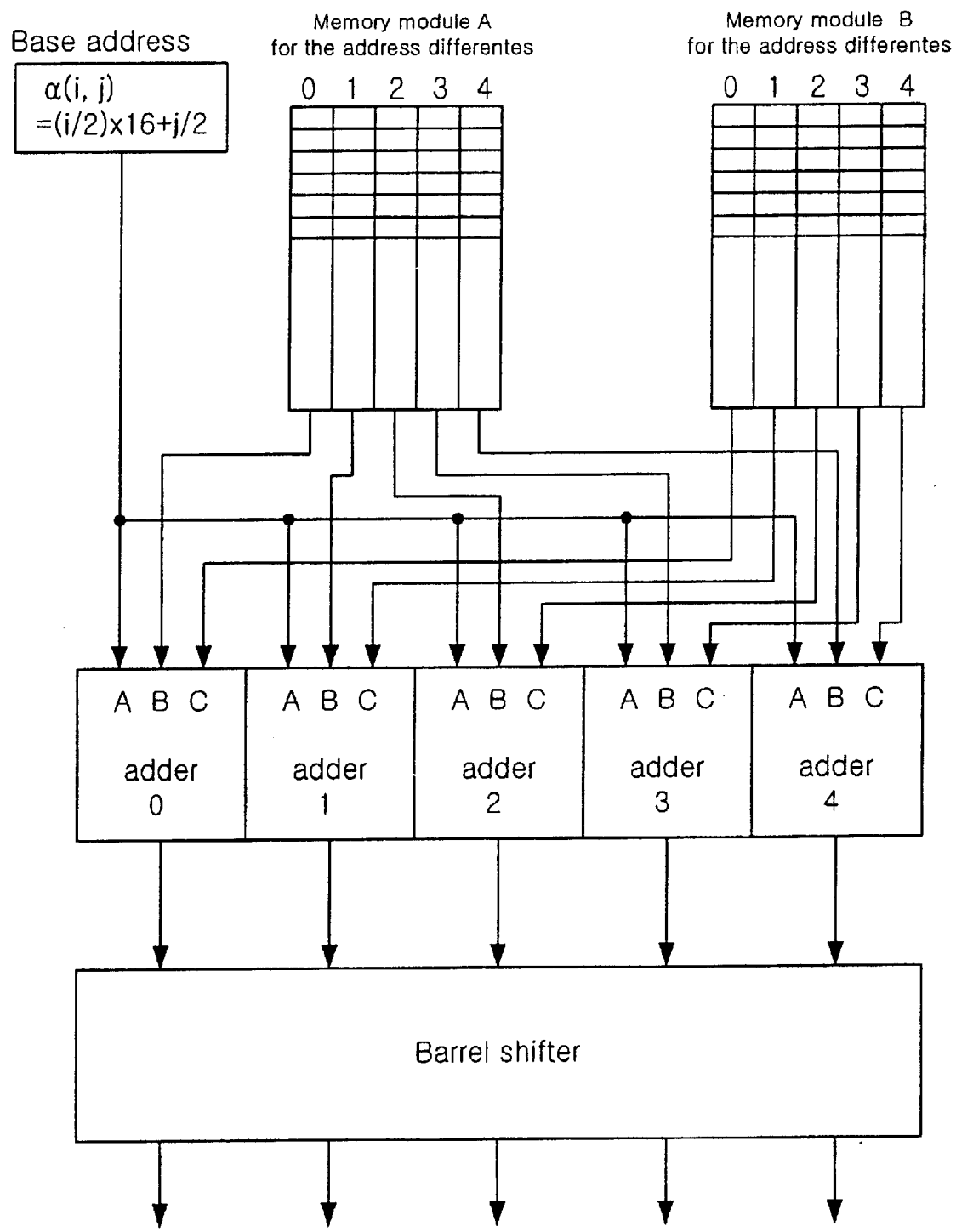
FIG. 8 a drawing of the address calculation and routing circuitry for p=q=2, M×N=32×32, s=16, m=5.
Figure 10:
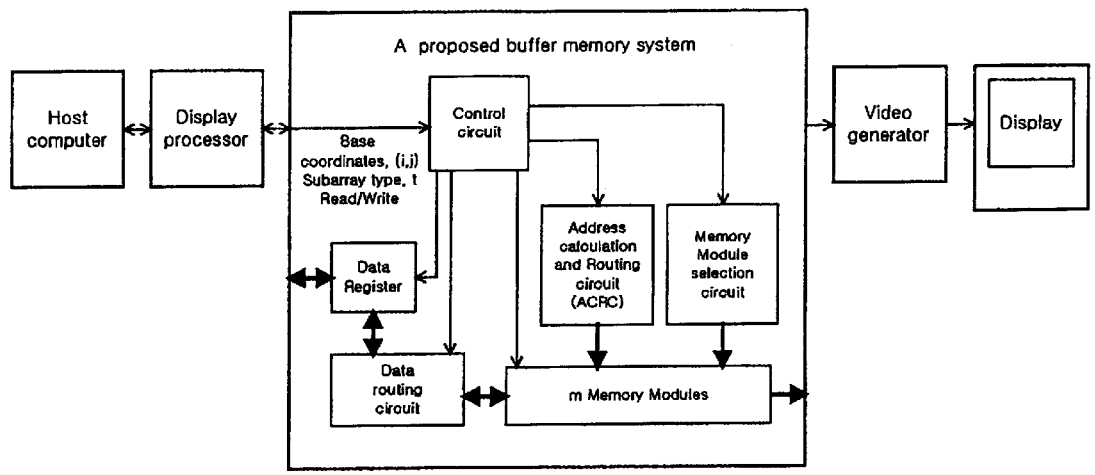
FIG. 10 is a block diagram, which shows the construction of a graphical display system which applies the memory system of the present invention.

The index numbers assigned by the memory module assignment function, $\mu(i,j)=(iq+j)\%m$, to each data element for p=q=2, M×N=32×32, and m=5 are shown in FIG. 6. The addresses assigned by the address assignment function, $\alpha(i,j)=(i/p)s+j/q$, to each data element for p=q=2, M×N=32×32, and s=16 are shown in FIG. 7. The address calculation and routing circuitry for p=q=2, M×N=32×32, s=16 and m=5 is represented in FIG. 8, where the address differences of memory modules A and B for the 12 subarray types and the constant interval r=1, 2, 3, 4 is shown in FIG. 10. The address calculation and routing, and memory module selection method proposed in the present invention is shown in the following examples:

EXAMPLE 1

For the SEB subarray located at (14, 15) with the constant interval 1, i.e., I(14, 15), I(14, 16), I(15, 15), I(15, 16) in the modified row major order, from FIG. 7, the index numbers of memory modules of $\mu(k)=(3, 4, 0, 1)$, from FIG. 8, the address, $\alpha(k)=(119, 120, 119, 120)$, the addresses arranged according to the index numbers of memory modules is therefore $\alpha(\mu)=(119, 120, x, 119, 120)$, where x means unaccessed memory module, whose index number is 2.

The procedure of the address calculation and routing, and memory module selection method proposed in the present invention is as follows:

for $i\%p=0, j\%q=1$, and r=1, $ASEB(\mu+\mu(0))\%m=(0, 0, 0, 0, 16)$ for the input B of each adder+$(0, 1, 0, 1, 0)$ for the input C of each adder=$(0, 1, 0, 1, 16)$ from FIG. 9;

therefore, it is $\alpha(k)=\alpha(0)(=119)+ASEB(\mu+\mu(0))=(119, 120, 119, 120, 135)$.

If those addresses are rotated right by $\mu(0)(=3)$, we get $\alpha(\mu)=(119, 120, 135, 119, 120)$. Because the one unaccessed module, $(\mu(i, j)+kr)\%m=(3+4)\%5=2$ from (103), $\alpha(\mu)$ becomes $(119, 120, x, 119, 120)$, which are the same as the above results.

The other examples are represented in Table 5.

TABLE 5(a)

Ex (2) SEB(14,15) of the constant interval 2: I(14,15),I(14,17),I(16,15), I(16,17)
$\mu(k) = (3,0,2,4)$ from FIG. 7
$\alpha(k) = (119,120,135,136)$ from FIG. 8
$\alpha(\mu) = (120,x,135,119,136)$ after arranging by using $\mu(k)$ and $\alpha(k)$
and marking unaccessed memory module, whose index number is 1.
Proposed Procedure
For i%p = 0, j%q = 1, and r = 2,
$ASEB((\mu+\mu(0))\%m) = (0,17,1,32,16)$ for the input B of each adder + $(0,0,0,0,0)$ for the input C of each other = $(0,17,1,32,16)$ from FIG. 10.
$\alpha(k) = \alpha(0) (=119) + ASEB((\mu+\mu(0))\%m) = (119,136,120,151,135)$.
$\alpha(\mu) = (120,x,135,119,136)$ after rotating right by $\mu(0)$ (=3)
and marking the one unaccessed module, $(\mu(i,j) + kr)\%m = (3+8)\%5 = 1$ from (103).

Ex (3) SWB(14,15) of the constant interval 2: I(14,15),I(14,12),I(17,15), I(17,12)
$\mu(k) = (3,0,4,1)$ from FIG. 7
$\alpha(k) = (119,118,135,134)$ from FIG. 8
$\alpha(\mu) = (118,134,x,119,135)$ after arranging by using $\mu(k)$ and $\alpha(k)$ TABLE 5(a)-continued and marking unaccessed memory module, whose index number is 2.
Proposed Procedure
For i%p = 0, j%q = 1, and r = 3,
ASWB(($\mu$+$\mu$(0))%m) = (0,16,-2,14,46) for the input B of each adder + (0,0,1,1,1) for the input C of each other =
(0,16,-1,15,47) from FIG. 10.
α(k) = α(0) (=119) + ASWB(($\mu$+$\mu$(0))%m) =
(119,135,118,134,166).
α($\mu$) = (118,134,x,119,135) after rotating right by $\mu$(0) (=3) and marking the one unaccessed module,
($\mu$(i,j) - (q-1)r + kr)%m = (3-3+12)%5 = 2 from (104).

Ex (4) SEL(14,15) of the constant interval 2: I(14,15),I(16,17),I(18,19), I(20,21)
$\mu$(k) = (3,4,0,1) from FIG. 7
α(k) = (119,136,153,170) from FIG. 8
α($\mu$) = (153,170,x,119,136) after arranging by using $\mu$(k) and α(k) and marking unaccessed memory module, whose index number is 2.
Proposed Procedure
For i%p = 0, j%q = 1, and r = 2,
ASEL(($\mu$+$\mu$(0))%m) = (0,17,34,51,68) for the input B of each adder + (0,0,0,0,0) for the input C of each other =
(0,17,34,51,68) from FIG. 10.
α(k) = α(0) (=119) + ASEL(($\mu$+$\mu$(0))%m) = (119,136,153,170,187).
α($\mu$) = (153,170,x,119,136) after rotating right by $\mu$(0) (=3) and marking the one unaccessed module,
($\mu$(i,j) + (q+1)kr)%m = (3+24)%5 = 2 from (108).

Ex (5) SWL(14,15) of the constant interval 2: I(14,15),I(16,13),I(18,11), I(20,9)
$\mu$(k) = (3,0,2,4) from FIG. 7
α(k) = (119,134,149,164) from FIG. 8
α($\mu$) = (134,x,149,119,164) after arranging by using $\mu$(k) and α(k) and marking unaccessed memory module, whose index number is 1.
Proposed Procedure
For i%p = 0, j%q = 1, and r = 2,
ASWL(($\mu$+$\mu$(0))%m) = (-1,44,14,59,29) for the input B of each adder +
(1,1,1,1,1) for the input C of each other =
(0,45,15,60,30) from FIG. 10.
α(k) = α(0) (=119) + ASWL(($\mu$+$\mu$(0))%m) =
(119,164,134,179,149).
α($\mu$) = (134,x,149,119,164) after rotating right by $\mu$(0) (=3) and marking the one unaccessed module,
($\mu$(i,j) + (q-1)kr)%m = (3+8)%5 = 1 from (110).

TABLE 5(b)

Ex (6) NWL(14,15) of the constant interval 3: I(11,12),I(8,9),I(5,6),I(2,3)
$\mu$(k) = (3,4,0,1) from FIG. 7
α(k) = (119,86,68,35) from FIG. 8
α($\mu$) = (68,35,x,119,86) after arranging by using $\mu$(k) and α(k) and marking unaccessed memory module, whose index number is 2.
Proposed Procedure
For i%p = 0, j%q = 1, and r =3,
ANWL(($\mu$+$\mu$(0))%m) = (-1,-34,-52,-85,-103) for the input B of each adder +
(1,1,1,1,1) for the input C of each other =
(0,-33,-51,-84,-102) from FIG. 10.
α(k) = α(0) (=119) + ANWL(($\mu$+$\mu$(0))%m) = (119,86,68,35,17).
α($\mu$) = (68,35,x,119,86) after rotating right by $\mu$(0) (=3) and marking the one unaccessed module,
($\mu$(i,j) - (pq-1)qr -(pq-1)r +(q+1)kr)%m = (3-18-9+36)%5 = 2 from (112).

Ex (7) NEL(14,15) of the constant interval 4: I(14,15),I(10,19),I(6,23), I(2,27)
$\mu$(k) = (3,4,0,1) from FIG. 7
α(k) = (119,89,59,29) from FIG. 8
α($\mu$) = (59,29,x,119,89) after arranging by using $\mu$(k) and α(k) and marking unaccessed memory module, whose index number is 2.
Proposed Procedure
For i%p = 0, j%q = 1, and r =4,
ANEL(($\mu$+$\mu$(0))%m) = (0,-30,-60,-90,-120) for the input B of each adder +
(0,0,0,0,0) for the input C of each other =
(0,-30,-60,-90,-120) from FIG. 10.
α(k) = α(0) (=119) + ANWL(($\mu$+$\mu$(0))%m) = (119,89,59,29,-1).

TABLE 5(b)-continued

α($\mu$) = (59,29,x,119,89) after rotating right by $\mu$(0) (=3) and marking the one unaccessed module,
($\mu$(i,j) - (pq-1)qr +(pq-1)r +(q-1)kr)%m = (3-24+12+16)%5 = 2 from (114).).

As there is a desire to modify and display text and images quickly and precisely, the demand for a faster and higher-resolution graphical display system is on the increase. Many current graphical display systems utilize a buffer memory system to contain a two-dimensional image array to be modified and displayed. The graphical display system updates image points in a buffer memory system according to the commands from the host computer, reads the image points from the buffer memory system, and then sends the image points to the display according to the raster scanning pattern. For a fast and high-resolution graphical display system, a faster buffer memory system is required in order to reduce the time to update the buffer memory system. The number of bits contained in a single memory chip increases in pace with the advances in chip production technology. Therefore, it is more desirable for a fast buffer memory system to increase the number of memory modules of a relatively small number of bits in a single memory chip, in order to access many image points within a subarray in parallel, than to reduce access time of a single memory module of a large number of bits.

Therefore, in order to speed up the update of the buffer memory system, it is required that the buffer memory system access many image points within an image subarray in parallel.

Memory System for Block, Horizontal, Vertical, Forward-diagonal, and Backward-diagonal Subarray Here, an efficient buffer memory system for a fast and high-resolution graphical display system is considered. The memory system provides parallel accesses to pq image points within a block (p×q), a horizontal (1×pq), a vertical (pq×1), a forward-diagonal, or a backward-diagonal subarray in a two-dimensional image array, M×N, where the design parameters p and q are all powers of two.

A graphical display system, which is shown in FIG. 10, usually consists of a host computer, a display processor, a buffer memory system, a video generator, and a display. The display processor updates image points in the buffer memory system according to the commands from the host computer.

The video generator reads image points from the buffer memory system and then sends those image points to the display according to the raster scanning pattern. In order to reduce the access time to the image points in the M×N image array, a buffer memory system to access pq image points in parallel in the M×N image array is required in the graphical display system. The various sizes of the visible area of conventional graphical displays are represented in Table 6. The size of a buffer system should be at least the same as the size of the visible area of a specific display system.

TABLE 6

| Number of Lines (M) | Number of Image Points (N) |
|---|---|
| 485 | 512 |
| 485 | 640 |
| 512 | 512 |
| 600 | 800 |
| 768 | 1024 |

TABLE 6-continued

| Number of Lines (M) | Number of Image Points (N) |
|---|---|
| 900 | 1152 |
| 960 | 1280 |
| 1024 | 1024 |
| 1024 | 1280 |
| 1080 | 1920 |
| 1200 | 1600 |

For example, for the display of 960 (number of lines)× 1280 (number of image points within a line), the minimum values of M and N are 960 and 1280, respectively. Therefore, many of the graphical systems force the value of N to not be a power of two.

The buffer memory system (100) is required to access image points within a horizontal, a vertical, or a block subarray in parallel to reduce the write time of a horizontal line, a vertical line, or a character. In addition, parallel accesses to image points within a forward-diagonal or a backward-diagonal subarray is also required to reduce the write time of a line of an integral multiple of 45° or for a rotation of a line by an integral multiple of 45°. Therefore, in order to speed up the update of a buffer memory system (100), the buffer memory system should provide parallel accesses to the following pq image points within a block (BL), horizontal (HR), vertical (VR), forward-diagonal (FD), or backward-diagonal (BD) subarray at a base coordinate (i,j) within an M×N image array I(*,*):

$$BL(i,j)=\{I(i+a, j+b)|0\leq a<p, 0\leq b<q\}\ 0\leq i\leq M-p, 0\leq j\leq N-q \quad (115)$$

$$HR(i,j)=\{I(i,j+a)|0\leq a<pq\}, 0\leq i\leq M-1, 0\leq j\leq N-pq \quad (116)$$

$$VR(i,j)=\{I(i+a,j)|0\leq a<pq\}, 0\leq i\leq M-pq, 0\leq j\leq N-1 \quad (117)$$

$$FD(i,j)=\{I(i+a,j+a)|0\leq a<pq\}, 0\leq i\leq M-pq, 0\leq j\leq N-pq \quad (118)$$

$$BD(i,j)=\{I(i+a,j-a)|0\leq a<pq\}, 0\leq i\leq M-pq, pq-1\leq j\leq N-1 \quad (119)$$

Figure 11:
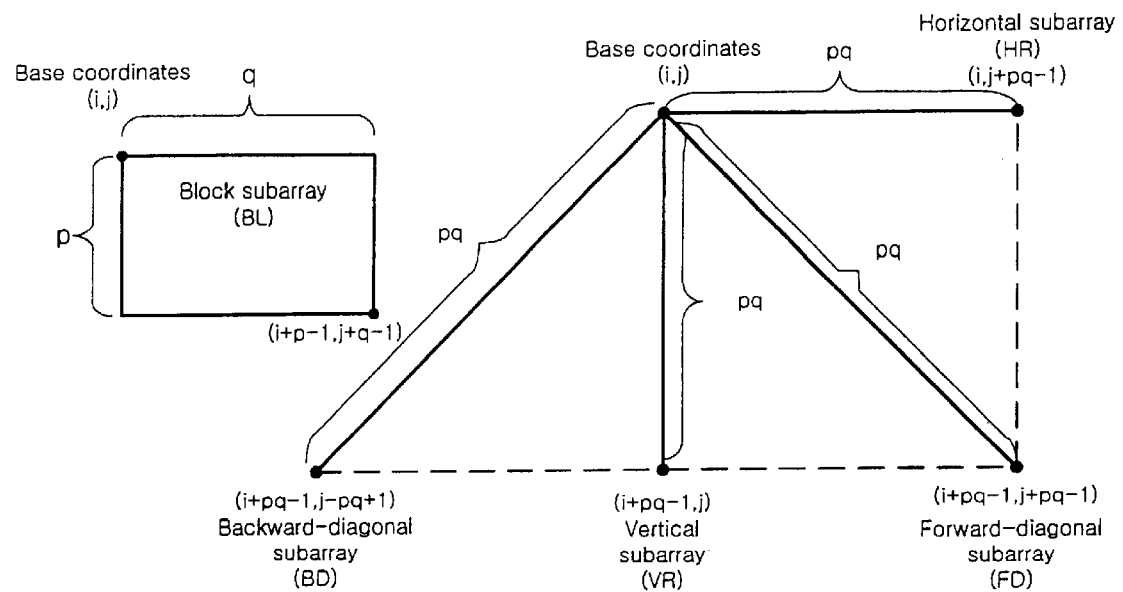
FIG. 11 shows subarray types and base coordinates.

The above subarrays with base coordinates (i,j) are represented in FIG. 11, where the base coordinates mean the coordinates of the base image points, I(i,j). When a subarray is stored, the components of the buffer memory system shown in FIG. 11 perform the following operations sequentially under the control of the control circuit according to the request of the display processor:

(1) t, i, and j registers are set by the display processor to indicate the subarray type (t=0 for BL, t=1 for HR, t=2 for VR, t=3 for FD, and t=4 for BD) and the base coordinates, (i,j) of the required subarray (1)–(5), and the subarray itself is placed in the data register in the row major order;
(2) The address calculation and routing circuit (ACRC) computes the m addresses of the image points within the subarray, and routes them to the m memory modules;
(3) The memory module selection circuit enables the pq memory modules to be accessed;
(4) The data routing circuit routes pq image points within the subarray in the data register to the m memory modules; and
(5) A WRITE signal causes the pq image points within the subarray to be stored in the pq enabled memory modules, where the operations (2), (3) and (4) are performed in parallel.

Similarly, when a subarray is to be retrieved from the buffer memory system, the components of the buffer memory system perform the following operations sequentially:

(1) t, i, and j registers are set;
(2) The ACRC computes the m addresses of the image points within the subarray, and routes them to the m memory modules;
(3) The memory module selection circuit enables the pq memory modules to be accessed;
(4) A READ signal causes the pq image points within the subarray to be retrieved from the pq enabled memory modules; and
(5) The data routing circuit routes the pq image points from the m memory modules to the data register, and arranges the pq image within the subarray (1)–(5) in the row major order, where the operations (2) and (3) and performed in parallel.

Figure 12:
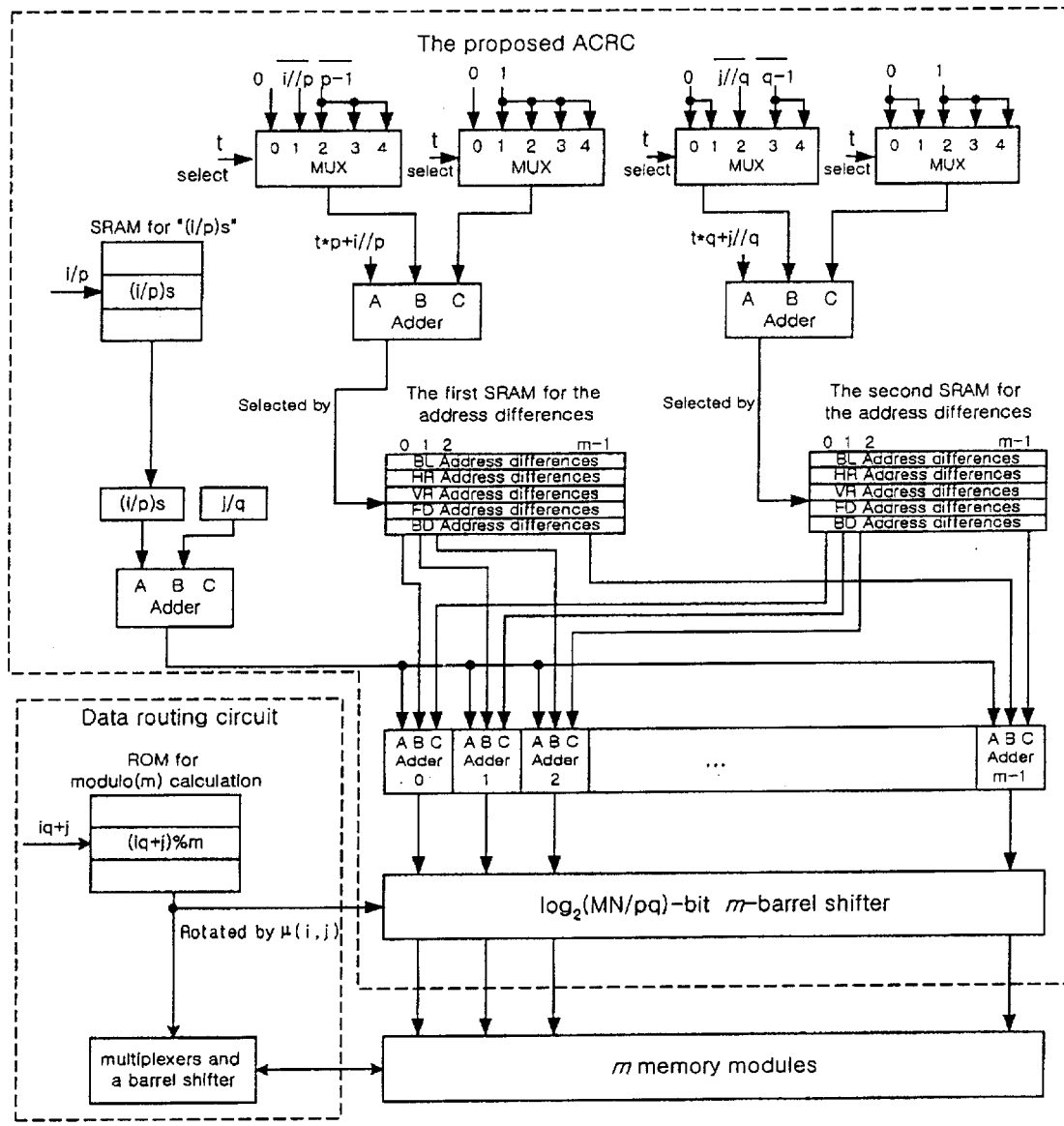
FIG. 12 is a detailed schematic of an address calculation and routing circuit (ACRC) according to the present invention.

The ACRC according to the present invention is represented in FIG. 12. The ACRC consists of two SRAMs for the address differences, four 5×1 multiplexers, (m+3) adders, an SRAM for the value "(i/p)s", and a barrel shifter.

The first term of the address differences of the BL, VR, FD, or BD subarray represents p different values according to the value "i%p" for $\mu$, $0\leq\mu<m$. The first term of the address differences of the HR subarray has no variance according the value "i%p" for $\mu$, $0\leq\mu<m$. The second term of the address differences of the BL, HR, FD, or BD subarray represents q different binary values according to the value "j%p" for $\mu$, $0\leq\mu<m$.

The second term of the address differences of the VR subarray has no variance according to the value "j%p" as well as $\mu$, $0\leq\mu<m$. Therefore, the first SRAM for the address differences is accessed by the subarray type and the value "i%p" and supplied to B inputs of the m adders, and the second SRAM for the address differences is accessed by the subarray type and the value "j%q" and supplied to C inputs of the m adders, where the sizes of the first SRAM and the second SRAM for the address differences are (4p+1)×m×$\log_2$(MN/pq) bits and (4q+1)×m bits, respectively.

In FIG. 12, the select addresses of the first SRAM for the address differences are t·p+i%p for the $0^{th}$ p×m address differences of the BL subarray, t·p for the first 1×m address differences of the HR subarray, and t·p+i%p−(p−1), which is t·p+i%p+2's complement of (p−1), for the second, the third, and the fourth p×m address differences of the VR, FD subarray, and BD subarrays.

The select addresses of the second SRAM for the address differences are t·q+j%q for the $0^{th}$ and the first q×m address differences of the BL and the HR subarrays, t·q for the second 1×m address differences of the VR subarray and t·q+j%q−(q−1), which is t·q+j%q+2's complement of (q−1), for the third and the fourth q×m address differences of the FD and the BD subarrays.

The values t·p+i%p, and t·q+j%q can be obtained simply by concatenating t·p and i%p, and t·q and j%q, respectively, without a multiplication or an addition for the case when p and q are all powers of two.

A SRAM access for the value "(i/p)s" is a replacement of a single multiplication which is required in the calculation of the base address α(i, j). If s is chosen to be a power of two for the case when N is not a power of two in order to eliminate the single multiplication operation in the calculation of the base address, the number of the additional but unused memory location is q(s−$_\uparrow$N/q$_\uparrow$)M, which is 60% of the accessed locations for the image array of M×N=960× 1280.

In the ACRC according to the present invention, when s is not a power of two, the value "(i/p)s" obtained by accessing the SRAM is added to the value "j/q" for the base address. When s is a power of two, the value "(i/p)s" is obtained by attaching $\log_2(s/p)$ zeros to the least significant bit of the value "i". The sum of the values "(i/p)s" and "j/q" is supplied to input A of the m adders.

Below, the hardware algorithm of the address calculation and routing according to the present invention is compared with the previous memory systems in terms of its hardware cost, complexity of control and the speed, wherein parallel accesses to data elements within at least three subarray types located at an arbitrary location in a data array are supported and the hardware implementation of the address calculation and routing circuit is considered, D. C. Van Voorhis and T. H. Morrin, *IEEE Trans. Comput.*, vol. C-27, pp.113–125, February 1978; J. W. Park, *IEEE Trans. Comput.*, vol. C-35, pp.669–674, July 1986; D. H. Lawrie and C. R. Vora, *IEEE Trans. Comput.*, vol. C-31, pp.435–442, May 1982; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996.

The memory systems proposed by Van Voorhis and Morrin and Lawrie and Vora compute $\alpha(\mu)$, the address within each memory module $\mu$, $0 \leq \mu < m$, directly, D. C. Van Voorhis and T. H. Morrin, *IEEE Trans. Comput.*, vol. C-27, pp.113–125, February 1978; D. H. Lawrie and C. R. Vora, *IEEE Trans. Comput.*, vol. C-31, pp.435–442, May 1982. The ACRCs are complex to control and costly because the address calculation is not separated from the address rotation of the address routing, D. C. Van Voorhis and T. H. Morrin, *IEEE Trans. Comput.*, vol. C-27, pp.113–125, February 1978; D. H. Lawrie and C. R. Vora, *IEEE Trans. Comput.*, vol. C-31, pp.435–442, May 1982. The ACRC compute $\alpha(\mu)$, which is $\alpha(i+((k-\mu(i,j))\%m)/q, j+((k-\mu(i,j))/m)\%q)$, $\alpha(i, j-(k+\mu(i,j))/m)$, $\alpha(i+(p(\mu((i,j))-k))\%m, j)$ for the BL, HR, and VR subarrays, respectively for each memory module k, D. H. Lawrie and C. R. Vora, *IEEE Trans. Comput.*, vol. C-31, pp.435–442, May 1982.

Therefore, the hardware components and the serial time in the first row of Table 7 are required to compute $\alpha(\mu)$ as fast as possible for the m memory modules for the memory system, D. C. Van Voorhis and T. H. Morrin, *IEEE Trans. Comput.*, vol. C-27, pp.113–125, February 1978.

Table 7 shows the comparison of the hardware components and the propagation delay times of the references and the present invention as proposed herein, (16) D. C. Van Voorhis and T. H. Morrin, "Memory Systems for Image Processing," *IEEE Trans. Comput.*, vol. C-27, pp. 113–125, February 1978; (17) J. W. Park, "An Efficient Memory System for Image Processing," *IEEE Trans. Comput.*, vol. C-35, pp. 669–674, July 1986; "An Efficient Memory System for Image Processing," Korean Patent No. 32719 (1990); "Memory System for Image Processing Having Address Calculating Circuitry Permitting Simultaneous Access to Block, Horizontal Sequence and Vertical Sequence Subarrays of an Array Data," U.S. Pat. No. 4,926,386 (1990); (18) D. H. Lawrie and C. R. Vora, "The Prime Memory System for Array Access," *IEEE Trans. Comput.*, vol. C-31, pp. 435–442, May 1982; (21) J. W. Park and D. T. Harper III, "Memory Architecture Support for the SIMD Construction of a Gaussian Pyramid," *IEEE Symp. Parallel and Distributed Processing*, pp. 444–451, December 1992; (22) J. W. Park and D. T. Harper III, "An Efficient Memory System for the Construction of a Gaussian Pyramid," *IEEE Trans. Parallel Distrib. Syst.*, vol. 7, No. 8, pp. 855–860, August 1996.

TABLE 7

| | Hardware Components | Propagation Delay Time |
|---|---|---|
| Van Voorhis and Morrin (16) | m × ($\log_2$(MN/pq) × $\log_2$(N/q)-bit multiplier) required when N is not a power of two; m × ($\log_2$m-bit adder); m × (modulo(m) calculator); m × ($\log_2$M-bit adder); m × ($\log_2$N-bit adder); m × ($\log_2$(MN/pq)-bit adder). | One multiplication time required when N is not a power of two + 1 × one $\log_2$m-bit addition time + 1 × one modulo(m) calculation time + max[one $\log_2$M-bit addition time, one $\log_2$N-bit addition time]* + 1 × one $\log_2$(MN/pq)-bit addition time. |
| Lawrie and Vora (18) | 1024 × 5-bit ROM for modulo(m) calculation; 4 × (1024 × 5-bit ROM + 23-bit multiplier + 23-bit adder) for the primary generator; 4 × 2 × (1024 × 2-bit ROM + 23 × (3 × 1 multiplexer) + 23-bit adder + 23 × (2 × 1 multiplexer) + 1024 × 1-bit ROM + 23-bit adder) for the secondary address generator. | 1024 × 5-bit ROM access time + 1024 × 5-bit ROM access time + 23-bit multiplication time + 23-bit addition time + 1024 × 2-bit ROM access time + 3 × 1 multiplexing time + 23-bit addition time. |
| Park (17) | 1 × ($\log_2$(MN/pq) × $\log_2$(N/q)-bit multiplier) required when N is not a power of two; m × ($\log_2$(MN/pq)-bit adder); pq × ($\log_2$(MN/pq)-bit 5 × 1 multiplexer) for the arrangement of the addresses; 1 × ($\log_2$(MN/pq)-bit m-barrel shifter). | One $\log_2$(MN/pq) × $\log_2$(N/q)-bit multiplication time required when N is not a power of two + 3 × one $\log_2$(MN/pq)-bit addition time + one 5 × 1 multiplexing time + one $\log_2$(MN/pq)-bit m-barrel shifting time |
| Park and Harper (21, 22) | 1 × ($\log_2$(MN/pq × $\log_2$(N/q)-bit multiplier) required when N is not a power of two; 1 × ($\log_2$(4p+q)-bit 5 × 1 multiplexer); 1 × ($\log_2$(3q)-bit 5 × 1 multiplexer); 2 × (1-bit 5 × 1 multiplexer); 1 × ($\log_2$(4p+q)-bit adder); | max[one $\log_2$(MN/pq) × $\log_2$(N/q)-bit multiplication time + one $\log_2$(MN/pq)-bit addition time, one 5 × 1 multiplexing time + max[one $\log_2$ (4p+q)-bit addition time, one $\log_2$(3q)-bit addition time] + one SRAM access time] |

TABLE 7-continued

| Hardware Components | Propagation Delay Time |
|---|---|
| 1 × ($\log_2(3q)$-bit adder);<br>(pq+1) × ($\log_2(MN/pq)$-bit adder);<br>m × ($\log_2(MN/pq)$-bit 5 × 1 multiplexer) for the arrangement of the addresses;<br>(4p+q) × pq · $\log_2(MN/pq)$-bit+3q × q-bit SRAMs for the address differences;<br>1 × ($\log_2(MN/pq)$-bit m-barrel shifter). | when N is not a power of two;<br>or max[one $\log_2(MN/pq)$-bit addition time, one 5 × 1 multiplexing time + max[one $\log_2(4p+q)$-bit addition time, one $\log_2(3q)$-bit addition time] + one SRAM access time] when N is a power of two; + one $\log_2(MN/pq)$-bit addition time + one 5 × 1 multiplexing time + one $\log_2(MN/pq)$-bit m-barrel shifting time. |
| Present Invention: 1 × (M/p × $\log_2(MN/pq)$- bit SRAM for "(i/p)s") required when N is not a power of two;<br>1 × ($\log_2(4p+1)$-bit 5 × 1 multiplexer);<br>1 × ($\log_2(4q+1)$-bit 5 × 1 multiplexer);<br>2 × (1-bit 5 × 1 multiplexer);<br>1 × ($\log_2(4p+1)$-bit adder);<br>1 × ($\log_2(4q+1)$-bit adder);<br>(m+1) × ($\log_2(MN/pq)$-bit adder);<br>(4p+1) × m · $\log_2(MN/pq)$-bit + (4q+1) × m-bit SRAMs for the address differences;<br>1 × ($\log_2(MN/pq)$-bit m-barrel shifter). | max[M/p × $\log_2(MN/pq)$-bit SRAM access time required when N is not a power of two + $\log_2(MN/pq)$-bit addition time, one 5 × 1 multiplexing time + max[one $\log_2(4p+1)$-bit addition time + (4p+1) × m · $\log_2(MN/pq)$-bit SRAM access time, one $\log_2(4q+1)$-bit addition time + (4q+1) × m-bit SRAM access time] + one $\log_2(MN/pq)$-bit addition time + one $\log_2(MN/pq)$-bit m-barrel shirting time. |

*max[x,y] selects the largest value between x and y.

For the calculation and routing of $\alpha(\mu)$ for the BSP, where the number of memory modules, and the number of processors, are 17 and 16, respectively, the HW components and the serial time in the second row of Table 7 are required for the memory system, D. H. Lawrie and C. R. Vora, *IEEE Trans. Comput.*, vol. C-31, pp.435–442, May 1982. In the memory systems by Park, and Park and Harper, the address calculation is separated from the address routing, J. W. Park, *IEEE Trans. Comput.*, vol. C-35, pp.669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996. The ACC (address calculation circuit) of the memory system computes pq addresses of the BL or the HR subarray by adding $\alpha(i,j)$, (0, s, or k, k=0, . . . , (p−1)), and (0,1), which requires one addition time in the adder array, and computes pq addresses of the VR subarray by adding $\alpha(i,j)$, (0 or s), and (ks, k=0, . . . (q−1)), which requires two addition times in the adder array, J. W. Park, *IEEE Trans. Comput.*, vol. C-35, pp.669–674, July 1986.

The ARC (address routing circuit) first arranges pq addresses of the VR subarray by two moves, and then, rotates them right by the number of (iq+j−1)%(pq+1) for the BL or the HR subarray, and (iq+j−q)%(pq+1) for the VR subarray.

The hardware components and the serial time in the third row of Table 7 are required to compute $\alpha(\mu)$ for the m memory modules for the memory system, J. W. Park, *IEEE Trans. Comput.*, vol. C-35, pp.669–674, July 1986.

The ACC's of the memory systems compute pq addresses of the BL, HR or VR subarray in one addition time adding $\alpha(i,j)$, the address differences of the first SRAM, and the address differences of the second SRAM, J. W. Park and D. T. Harper III, IEEE Symp. Parallel and Distributed Processing, pp.444–451, December 1992; J. W. Park and D. T. Harper III, *IEEE Trans. Parallel Distrib. Syst.*, vol. 7, No. 8, pp.855–860, August 1996. The size of the address differences for input B of pq adders is p×pq for all of the three subarray types.

The size of the address differences of the ACC's for input C of m adders is q×p for the BL because the address differences of the BL subarray does depend upon j%q as well i%p. Therefore, the sizes of the first SRAM and the second SRAM of the ACC will be 5p×pq and 3q×q for the five subarray types (115)–(119). The ARC's first arrange pq addresses of the BL, HR or VR subarray according to the index numbers of the memory modules, and then, rotates them right by the number of (iq+j)%(pq+1) for the BL, HR or VR subarray. Therefore, the hardware components and the serial time in the fourth row of Table 7 are required to compute $\alpha(\mu)$ for the memory systems. A drawback of the ACRC's are the complex arrangement of the addresses according to the index numbers of memory modules after the calculation of the addressees, which is dependent on the subarray type, because the output addresses from the ACC's are not arranged according to the index numbers of memory modules. In contrast, the hardware components and the serial time in the fifth row of Table 7 are required to compute $\alpha(\mu)$ for the memory system of the present invention, where the output addresses are arranged according to the index numbers of memory modules from $\mu(i,j)$. The merits of the circuit according to the present invention over the previous circuits are mainly due to the replacement of the multiplier with a SRAM in the speed and the elimination of the multiplexers and the reduction of size of the address differences from (4p+q)×pq×$\log_2(MN/pq)$j+3q×q bits to (4p+1)×m×$\log_2(MN/pq)$+(4q+1)×m in the complexity to control and the gate count, J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp.855–860, August 1996.

If it is considered that the size of an ordinary font is greater than or equal to 8×8, the values of p and q should be at least 8 and 8, respectively, in order to achieve the good performance of the graphical display system. Also, the value of pq should be less than or equal to the minimum value between M and N.

The hardware components and the propagation delay time of the ACRC are compared in Table 8 for M×N×b=960× 1280×24, p=q=8, and m=67, and p=q=16, and m=257.

m×log$_2$(MN/pq) lines crossing between them, in which the total number of lines are 5,025 and 16,705 for p=q=8 and p=q=16, respectively. The number of lines from the multiplier and the SRAM for the address differences to the pq adder is 2pq×log$_2$(MN/pq)+pq, and the number of lines from the m multiplexers to the m-barrel shifter is m×log$_2$(MN/pq)

TABLE 8

|  | Park and Harper (21,22) | Proposed |
|---|---|---|
| Hardware Components for p=q=8 | 15 × 8-bit multiplier<br>Not required<br>1 × (6-bit 5 × 1 multiplexer)<br>1 × (5-bit 5 × 1 multiplexer)<br>2 × (1-bit 5 × 1 multiplexer)<br>1 × (6-bit adder)<br>1 × (5-bit adder)<br>65 × (15-bit adder)<br>67 × (15-bit 5 × 1 multiplexer)<br>SRAMs for the address differences:<br>40 × 960-bit + 24 × 8-bit<br>15-bit 67-barrel shifter | Not required<br>SRAM for "(i/p)s": 120 × 15-bit<br>2 × (6-bit 5 × 1 multiplexer)<br><br>Same<br><br>2 × (6-bit adder)<br><br>68 × (15-bit adder)<br>Not required<br>SRAMs for the address differences:<br>33 × 1005-bit 33 × 67-bit<br>Same |
| Propagation delay time for p=q=8 | Max[15 × 8-bit multiplication time + 15-bit addition time, 5 × 1 multiplexing time + 6-bit addition time + 40 × 960-bit SRAM access time] + 15-bit addition time + 5 × 1 multiplexing time + 15-bit 67-barrel shifting time | Max[120 × 15-bit SRAM access time + 15-bit addition time, 5 × 1 multiplexing time + 6-bit addition time + 33 × 1005-bit SRAM access time] + 15-bit addition time + 15-bit 67-barrel shifting time |
| Hardware Components for p=q=16 | 13 × 7-bit multiplier<br>Not required<br>1 × (7-bit 5 × 1 multiplexer)<br>1 × (6-bit 5 × 1 multiplexer)<br>2 × (1-bit multiplexer)<br>1 × (7-bit adder)<br>1 × (6-bit adder)<br>257 × (13-bit adder)<br>257 × (13-bit 5 × 1 multiplexer)<br>SRAMs for the address differences:<br>80 × 3328-bit + 48 × 16-bit<br>13-bit 257-barrel shifter | Not required<br>SRAM for "(i/p)s": 60 × 13-bit<br>2 × (7-bit 5 × 1 multiplexer)<br><br>Same<br><br>2 × (7-bit adder)<br><br>258 × (13-bit adder)<br>Not required<br>SRAMs for the address differences:<br>65 × 3341-bit 65 × 257-bit<br>Same |
| Propagation delay time for p=q=16 | Max[13 × 7-bit multiplication time + 13-bit addition time, 5 × 1 multiplexing time + 7-bit addition time + 80 × 3328-bit SRAM access time]+ 13-bit addition time + 5 × 1 multiplexing time + 13-bit 257-barrel shifting time | Max[60 × 13-bit SRAM access time + 13-bit addition time, 5 × 1 multiplexing time + 7-bit addition time + 65 × 3341-bit SRAM access time] + 13-bit addition time + 13-bit 257-barrel shifting time |

The multiplier of the memory systems is replaced by an SRAM in the memory system of the present invention in order to speed up the operation of the circuit, J. W. Park and D. T. Harper III, *IEEE Symp. Parallel and Distributed Processing*, pp. 444–451, December 1992; J. W. Park and D. T. Harper III, *IEEE Trans. Parallel Distrib. Syst.*, vol. 7, No. 8, pp. 855–860, August 1996. The memory system according to the present invention is less complex to control and less costly because the ACRC of the present invention does not require 5×1 multiplexers for the arrangement of the addresses according to the index number of memory modules after the calculation of the addresses compared with the previous memory systems, in which the gate count of the m×log$_2$(MN/pq)-bit 5×1 multiplexers is much greater than that of the total adders, that are one log$_2$(4p+1) adder+one log$_2$(4q+1) adder+(pq+1)+log$_2$(MN/pq)-bit adders, under the assumption that the gate counts of one 1-bit 5×1 multiplexer and one full adder are 12 and 7, respectively. Also, the routing from the (p+1) adders to the 5×1 multiplexers is very complex to implement and to control because there are 5 in the ACRC. Also, the number of lines from the m-barrel shifter to the m memory modules is m×log$_2$(MN/pq) in the ACRC. Therefore, the total number of lines in the ACRC is about 9 m×log$_2$(MN/pq). In contrast, the total number of lines in the ACRC of the present invention is 4 m×log$_2$(MN/pq), which is less than half of the number of lines in the ACRC.

The gate count and the propagation delay time of the ACRC are compared in Table 9 according to the gate count of the SAMSUNG Electronics ASIC KG75(0.6 μm Gate Array Cell Library), (21) J. W. Park and D. T. Harper III, "Memory Architecture Support for the SIMD Construction of a Gaussian Pyramid," *IEEE Symp. Parallel and Distributed Processing*, pp. 444–451, December 1992; (22) J. W. Park and D. T. Harper III, "An Efficient Memory System for the Construction of a Gaussian Pyramid," *IEEE Trans. Parallel Distrib. Syst.*, vol. 7, No. 8, pp. 855–860, August 1996.

TABLE 9

|  | p = 8<br>q = 8 | p = 8<br>q = 16 | p = 16<br>q = 8 | p = 16<br>q = 16 | p = 8<br>q = 32 | p = 32<br>q = 8 | p = 16<br>q = 32 | p = 32<br>q = 16 |
|---|---|---|---|---|---|---|---|---|
| Parker and Harper (21, 22) | | | | | | | | |
| Gate count (K) | 182 | 360 | 488 | 995 | 843 | 1553 | 2149 | 3027 |
| Propagation delay (ns) | 23 | 24 | 24 | 24 | 24 | 25 | 25 | 25 |
| Present Invention | | | | | | | | |
| Gate count (K) | 152 | 293 | 454 | 861 | 595 | 1477 | 1558 | 2805 |
| Propagation delay (ns) | 17 | 18 | 18 | 19 | 19 | 19 | 20 | 20 |
| Comparison | | | | | | | | |
| Gate count ratio | 1.197 | 1.229 | 1.075 | 1.156 | 1.417 | 1.051 | 1.379 | 1.079 |
| Propagation delay ratio | 1.353 | 1.333<br>(1.353) | 1.333<br>(1.353) | 1.263<br>(1.353) | 1.263<br>(1.353) | 1.316<br>(1.353) | 1.250<br>(1.353) | 1.250<br>(1.353) |
| Gate count ratio × propagation delay | 1.620 | 1.638 | 1.433 | 1.460 | 1.790 | 1.383 | 1.724 | 1.349 |
| Present Invention | | | | | | | | |
| Normalized gate count | 1.000 | 0.964 | 1.493 | 1.416 | 0.979 | 2.429 | 1.306 | 2.307 |
| Normalized propagation delay | 1.000 | 1.059 | 1.059 | 1.118 | 1.118 | 1.118 | 1.176 | 1.176 |
| Normalized product | 1.000 | 1.021 | 1.581 | 1.583 | 1.095 | 2.716 | 1.536 | 2.713 |

In Table 10, the comparison was carried out under the assumption of the propagation delay times of Table 10 for M×N×b=960×1280×24 and for the design parameters p and q whose values are the powers of two from 8 to 32 except that both values of p and q are 32, where pq>M.

TABLE 10

| Component | Propagation delay time (ns) |
|---|---|
| 15 × 8-bit multiplier | 9 |
| 14 × 8-bit multiplier | 9 |
| 14 × 7-bit multiplier | 9 |
| 13 × 8-bit multiplier | 9 |
| 13 × 7-bit multiplier | 8 |
| 13 × 6-bit multiplier | 8 |
| 12 × 6-bit multiplier | 8 |
| 12 × 7-bit multiplier | 8 |
| 15-bit adder | 2 |
| 14-bit adder | 2 |
| 13-bit adder | 2 |
| 12-bit adder | 2 |
| 8-bit adder | 1 |
| 7-bit adder | 1 |
| 6-bit adder | 1 |
| SRAM | 4 |
| ROM | 4 |
| 15 × 1-bit multiplier | 1 |
| 67-barrel shifter | 9 |
| 131-barrel shifter | 10 |
| 257-barrel shifter | 11 |
| 517-barrel shifter | 12 |

The gate count ratio and the propagation delay ratio are the ratios of the gate count and the propagation delay time of the ACRCs to the gate count and the propagation delay time of the ACRC of the present invention, respectively. The average gate count ratio and the average propagation delay ratio are 1.198 and 1,295, respectively. The average value of the product of the gate count ratio and the propagation delay ratio is 1.549. For the ACRC of the present invention, the normalized gate count is the gate count divided by the gate count for p=q=8 and divided by pq/64, and the normalized propagation delay is the propagation delay time divided by the propagation delay time for p=q=8. The normalized product is obtained by multiplying the normalized gate count and the normalized propagation delay. According to the normalized product, the best values of p and q for the ACRC of the present invention are 8 and 8, respectively, because their normalized product is the smallest one for M×N×b=960×1,280×24. The normalized product can be used to select the best values of p and q for the required ACRC. Table 11 represents required |(p1,q1)| and a configuration using the best choice of |(p2,q2)|, where, |(p1,q1)|and |(p2,q2)| represent the buffer memory systems whose values of p and q are p1 and q1, and p1 and q2, respectively.

TABLE 11

| Required |(p1,q1)| | Configuration using the best choice of |(p2,q2)| |
|---|---|
| |(8,8)| | |(8,8)| using the one |(8,8)| |
| |(8,16)| | |(8,8)| |(8,8)| using the two |(8,8)| |
| |(16,8)| | |(8,8)|<br>|(8,8)| using the two |(8,8)| |
| |(16,16)| | |(8,8)| |(8,8)|<br>|(8,8)| |(8,8)| using the four |(8,8)| |
| |(8,32)| | |(8,8)| |(8,8)| |(8,8)| |(8,8)| using the four |(8,8)| |
| |(32,8)| | |(8,8)|<br>|(8,8)|<br>|(8,8)|<br>|(8,8)| using the four |(8,8)| |
| |(16,32)| | |(8,8)| |(8,8)| |(8,8)|<br>|(8,8)| |(8,8)| |(8,8)| |(8,8)| using the eight |(8,8)| |
| |(32,16)| | |(8,8)| |(8,8)|<br>|(8,8)| |(8,8)|<br>|(8,8)| |(8,8)|<br>|(8,8)| |(8,8)| using the eight |(8,8)| |

Here, |(p1,q1)| represents a buffer memory system whose design parameters are p1 and q1.

For example, if an ACRC of |(32,8)| is required, for ACRC |(8,8)| are recommended to be combined with the required ACRC. If an ACRC of |(8,16)|, |(16,8)|, |(16,16)|, |(8,32)|, |(32,8)|, |(16,32)|, or |(32,16)| is constructed by using the ACRC of |(8,8)|, their propagation delay ratios are increased to 1.353, which in turn results in the average propagation ratio of 1.353.

Because the data routing circuit performs a modulo (m) calculation, multiplexing, and rotation operation, and because the memory module selection circuit performs a modulo (m) calculation and a decoding operation, the propagation delay time of the data routing circuit or the memory module selection circuit is less than that of the ACRC of the present invention. Therefore, if the access time of the m memory modules is less than the propagation delay time of the ACRC of the present invention and if there are m memory address registers between the ACRC and the m memory modules and m memory buffer registers between the data routing circuit and m memory modules, the buffer memory system of the present invention can be performed in a pipelined mode at a rate of the propagation delay time of the ACRC.

Also, if the display processor performs an elementary operation on the pq image points from the buffer memory system within the propagation delay time of the ACRC of the present invention, the overall performance of the frame buffer display system of the present invention can be increased by the factor of 1.353 on the average over the frame buffer display system using the previous ACRCs. Therefore, the ACRC proposed in the present invention is less costly, less complex to control, and faster than the previous memory systems.

Below, the method of the address calculation and routing, and data routing according to the present invention is compared with the methods of the previous memory systems in terms of restriction of subarray types, constant intervals, the size of a data array, hardware cost, speed, and complexity, where a simultaneous access to data elements within at least three subarray types located at an arbitrary location in a data array is supported and the hardware implementation of the address calculation and routing circuitry, and the data routing circuitry within the memory system is considered.

The ACRC of the present invention for a block, row, column, forward-diagonal, and backward-diagonal subarray with constant interval 1 is explained to be less costly, less complex to control, and faster than the previous memory systems.

The memory system consists of m memory modules and pq PE's, where $pq \leq m$ and m is prime, A. Deb, *IEEE Trans. Parallel Distrib. Syst.*, Vol. 7, No. 6. pp. 595–604, June 1996. Lawrie and Vora (D. H. Lawrie and C. R. Vora, *IEEE Trans. Comput.*, vol. C-31, pp. 435–442, May 1982) defined a linear pq-vector, V(a,b,c,e), to be a pq-element set of the elements of the array formed by linear subscript equations:

$$V(a,b,c,e) = \{A(i,j): i=ax+b, j=cx+e\}, \ 0 \leq x < pq \leq m$$

Lawrie and Vora (D. H. Lawrie and C. R. Vora, *IEEE Trans. Comput.*, vol. C-31, pp. 435–442, May 1982) obtained $\alpha(\mu)$, the address of $\mu$th module:

$$\alpha(\mu) = ((a+cM)((-(b+eM+\text{base}))d'\%m)+b+eM+\text{base})/pq,$$

where $(a+cM) \cdot d' = 1\%m$, "base" is the base address of the array of data element (i,j), and M is the number of rows of the array.

From $(a+cM) \cdot d' = 1\%m$, d' cannot be obtained for the case that any one of the constant interval, M, M+1, or M−1 is an integral multiple of m because the values a and c should be defined as follows for each access type:

a=0 and c=a positive constant interval for the row subarray;

c=0 and a=a positive constant interval for the column subarray;

a=c=a positive constant interval for the forward-diagonal subarray; and a=−c=a positive constant interval for the backward-diagonal subarray.

Therefore, the memory places restriction on the constant interval, the size of the data array, and the number of memory modules, D. H. Lawrie and C. R. Vora, *IEEE Trans. Comput.*, vol. C-31, pp. 435–442, May 1982.

Meanwhile, the memory systems and the memory system according to the present invention do not place restriction on the size of the data array. Only the restriction of the memory system of the present invention is that the constant interval cannot be a multiple of the number of the memory modules from Theorem 1. One multiplexer for the arrangement of the addresses before right-rotation by $\mu(i,j)$ and the multiplexing time for the memory systems are not required in the address calculation of the present invention and routing circuitry because of the prearrangement of the address differences, J. W. Park, *IEEE Trans. Comput.*, vol. C-35, pp. 669–674, July 1986; J. W. Park and D. T. Harper III, *IEEE Symp. Parallel and Distributed Processing*, pp.444–451, December 1992; J. W. Park and D. T. Harper III, *IEEE Trans. Parallel Distrib. Syst.*, vol. 7, No. 8, pp. 855–860, August 1996. If the multiplexer is implemented by using the method of the address calculation and routing for the 12 subarray types, it will be very complex to control because the arrangement of the addresses depends upon the subarray types and the constant interval, J. W. Park, *IEEE Trans. Comput.*, vol. C-35, pp. 669–674, July 1986; J. W. Park and D. T. Harper III, *IEEE Symp. Parallel and Distributed Processing*, pp. 444–451, December 1992; J. W. Park and D. T. Harper III, *IEEE Trans. Parallel Distrib. Syst.*, vol. 7, No. 8, pp. 855–860, August 1996. The data routing circuitry in the memory system requires a variable right rotate permuter controlled by $\mu(i,j)$, D. C. Van Voorhis and T. H. Morrin, *IEEE Trans. Comput.*, vol. C-27, pp. 113–125, February 1978. The data routing of the memory systems by Park, and Park Harper is performed by a multiplexer and a barrel shifter, J. W. Park, *IEEE Trans. Comput.*, vol. C-35, pp.669–674, July 1986; J. W. Park and D. T. Harper III, *IEEE Symp. Parallel and Distributed Processing*, pp. 444–451, December 1992; J. W. Park and D. T. Harper III, *IEEE Trans. Parallel Distrib. Syst.*, vol. 7, No. 8, pp. 855–860, August 1996. In the memory system, the variable right rotate permuter in the data routing circuitry of the memory system is replaced by a crossbar network, which is complex, costly, and slow.

In the present invention, a data routing method using a multiplexing and rotation is described, where the 12 data routing patterns with a positive constant interval r for the 12 subarray types are reduced into the two routing patterns with the interval r1(=r%m) that are implemented by using a ROM, a $\log_2(2(m-1)) \times 2(m-1)$ decoder, a selector using tri-state buffers, and a barrel shifter. Also, according to Table 1, the address calculation and routing, and data routing circuitry according to the present invention supports more subarray types and the constant intervals.

Therefore, the method of the address calculation and routing, and data routing according to the present invention is superior to the methods of the previous memory systems in terms of restriction of subarray types, constant intervals, the size of a data array, hardware cost, speed, and complexity.

Industrial Applicability

Therefore, the conflict-free memory system of the present invention is an improvement over the previous memory systems, where a simultaneous access to data elements within at least three subarray types located at an arbitrary location in a data array is supported and the hardware implementation of the address calculation and routing circuitry, and the data routing circuitry within the memory system is considered, in terms of restriction of subarray types, constant intervals, and the size of a data array, hardware cost, speed and complexity.

Various matrix operations and image processing operations can be speeded up by an SIMD processor with pq PE's and a memory system with m memory modules, where m is a prime number greater than pq.

The SIMD processor requires a memory system to access pq data elements within various types of rectangular blocks and an eight-directional line subarrays with a positive constant interval in a data array, where the constant interval, the size of the data array, and the location of data elements should not be restricted.

The conflict-free memory system with prime memory modules according to the present invention supports simultaneous access to pq data elements within a four-directional rectangular block (South-East Block, South-West Block, North-West Block, North-East Block) or eight-directional line (East Line, South,-East Line, South Line, South-West Line, West Line, North-West Line, North Line, North-East Line) subarray located anywhere within a data array, where the data elements are related by a constant interval of a positive integer.

What is claimed is:

1. A conflict-free memory system, which can reduce access time to a memory system of a Single-Instruction Multiple-Data stream processor having pq units of processing elements, which comprises m units of memory modules where m>pq;

an address calculation and routing circuitry, which computes m units of addresses of data elements and routes these values to m units of memory modules;

a memory module selection circuitry, which selects pq units of memory modules to be accessed; a data register, which stores designated subarray types, base coordinates, and interval information required for the subarray types;

a data routing circuitry, which routes the data in said data register to m units of said memory modules;

wherein said conflict-free memory system supports simultaneous access to pq units of data elements of subarray types of four-directional rectangular blocks of South-East Block, South-West Block, North-West Block, and North-East Block, or eight-directional lines of East Line, South-East Line, South Line, South-West Line, West Line, North-West Line, North Line, and North-East Line, each of which is a subarray located anywhere within a data array, wherein the data elements are related by a constant interval of a positive integer.

2. The conflict-free memory according to claim 1, wherein said address calculation and routing circuitry comprises four units of 5×1 multiplexers, which receive base coordinates, subarray types, and interval information;

first and second SRAM's for prearranging and storing address differences; a third SRAM for (i/p)s values; m+3 units of adders consisting of two adders which supply the output values of said multiplexers to said first and second SRAM's, and an adder which receives output values from said third SRAM for addition, and m units of adders;

a barrel shifter which supplies output of m units of said adders to m units of memory modules according to the rotation signals of said data routing circuitry.

3. A method of address calculation and data routing by using a conflict-free memory system, which comprises the steps of:

prearranging p×m address differences and q×m address differences for each subarray type and each constant interval;

storing prearranged p×m address differences and q×m address differences in memory modules A and B, respectively, for each subarray type and each constant interval;

reading m units of address differences from memory modules A and B with the required subarray types, i % p, and j % q and the constant interval;

adding m units of address differences as read to the base address, $\alpha(i,j)$; rotating m units of addresses by $\mu(0)$ for all the 12 subarray types and constant intervals; and routing m units of addresses as calculated by rotation to m units of memory modules.

* * * * *